(12) United States Patent
Schuller et al.

(10) Patent No.: US 12,251,719 B2
(45) Date of Patent: Mar. 18, 2025

(54) NOZZLE ASSEMBLY FOR DELIVERING AN OSCILLATING SPRAY PATTERN

(71) Applicant: Sonny's HFI Holdings, LLC, Wilmington, DE (US)

(72) Inventors: Peter Schuller, Elko, MN (US); Ryan Olson, Cannon Falls, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 249 days.

(21) Appl. No.: 17/204,251

(22) Filed: Mar. 17, 2021

(65) Prior Publication Data

US 2021/0346895 A1    Nov. 11, 2021

Related U.S. Application Data

(60) Provisional application No. 63/021,811, filed on May 8, 2020.

(51) Int. Cl.
  B05B 1/08    (2006.01)

(52) U.S. Cl.
  CPC .................................. B05B 1/083 (2013.01)

(58) Field of Classification Search
  CPC ......... B05B 1/083; B05B 3/0463; B05B 3/16; B05B 3/008; B05B 3/00
  See application file for complete search history.

(56) References Cited

U.S. PATENT DOCUMENTS

| | | |
|---|---|---|
| 2,706,108 A | 4/1955 | Miner |
| 3,377,139 A | 4/1968 | MacGregor et al. |
| 3,388,868 A | 6/1968 | Watson et al. |
| 3,730,440 A | 5/1973 | Parkison |
| 3,941,355 A | 3/1976 | Simpson |
| 4,069,976 A | 1/1978 | Chauvigne |
| 4,253,608 A | 3/1981 | Hunter |
| 4,727,605 A * | 3/1988 | Henkin ................ A61H 33/027 4/DIG. 9 |
| 4,869,849 A | 9/1989 | Hirose et al. |
| 5,098,021 A | 3/1992 | Kah, Jr. |
| 5,160,086 A | 11/1992 | Kuykendal et al. |
| 5,169,065 A | 12/1992 | Bloch |

(Continued)

OTHER PUBLICATIONS

International Search Report and Written Opinion dated Sep. 1, 2022 in connection with International Patent Application No. PCT/US2022/019509, 16 pages.

(Continued)

*Primary Examiner* — Steven M Cernoch
(74) *Attorney, Agent, or Firm* — Dorsey & Whitney LLP

(57) ABSTRACT

Nozzle assemblies adapted to produce an oscillatory spray pattern. A rotor member having at least one lobe engaged with one or more cavities of a stator surface for defining an oscillatory movement of the rotor member in response to a motive fluid along the rotor member and stator surface. The nozzle assembly directing the motive fluid along one or more tapered surfaces, such as complementary tapered surfaces of the rotor and stator surface. The rotor member is operatively coupled with the spray member for oscillatory movement therewith. The spray member adapted to receive the motive fluid and emit the fluid as a spray from the nozzle assembly. The spray having an oscillatory pattern that matches the oscillatory movement of the rotor.

16 Claims, 13 Drawing Sheets

(56) References Cited

U.S. PATENT DOCUMENTS

| | | |
|---|---|---|
| 5,213,260 A | 5/1993 | Tonkinson |
| 5,404,957 A | 4/1995 | McCormack |
| 6,273,512 B1 | 8/2001 | Rajewski |
| 6,460,734 B1 | 10/2002 | Schroeder et al. |
| 6,471,146 B1 | 10/2002 | Kuykendal et al. |
| 8,022,485 B2 | 9/2011 | Davies |
| 8,500,042 B2 | 8/2013 | Brown et al. |
| 8,544,567 B2 | 10/2013 | Comeau et al. |
| 8,740,450 B2 | 6/2014 | Mogami et al. |
| 9,132,393 B1 | 9/2015 | Ross |
| 9,370,754 B2 | 6/2016 | Mcclimond |
| 9,433,954 B2 | 9/2016 | Analetto et al. |
| 9,714,010 B2 | 7/2017 | Fazio et al. |
| 9,731,303 B2 | 8/2017 | Harris et al. |
| 2001/0054515 A1 | 12/2001 | Eddison et al. |
| 2003/0209611 A1 | 11/2003 | Harris et al. |
| 2003/0212149 A1 | 11/2003 | Grundmann et al. |
| 2010/0276820 A1 | 11/2010 | Mogami et al. |
| 2012/0018218 A1 | 1/2012 | Rosenhauch |
| 2013/0025169 A1 | 1/2013 | Mccarty et al. |
| 2014/0042245 A1 | 2/2014 | Buckner |
| 2014/0291873 A1 | 10/2014 | McClimond |
| 2015/0184806 A1 | 7/2015 | Beg et al. |
| 2015/0273489 A1 | 10/2015 | Harris et al. |
| 2018/0304285 A1 | 10/2018 | Mcclimond |
| 2021/0252531 A1 | 8/2021 | Boily |
| 2021/0316258 A1 | 10/2021 | Folk et al. |
| 2022/0288612 A1 | 9/2022 | Balzer et al. |
| 2023/0226505 A1 | 7/2023 | Folk et al. |
| 2024/0149229 A1 | 5/2024 | Folk et al. |

OTHER PUBLICATIONS

International Search Report and Written Opinion dated Aug. 10, 2021 in connection with International Patent Application No. PCT/US2021/031339, 12 pages.

Office Action dated Feb. 7, 2024 in connection with Canadian patent application No. 3,178,879, 3 pages.

Examination Report dated Oct. 8, 2024 in connection with New Zealand patent application No. 793220, 4 pages.

* cited by examiner

NOZZLE ASSEMBLY FOR DELIVERING AN OSCILLATING SPRAY PATTERN

CROSS-REFERENCE TO RELATED APPLICATIONS

This application claims priority to U.S. Provisional Patent Application No. 63/021,811, filed May 8, 2020, entitled "NOZZLE ASSEMBLY FOR DELIVERING AN OSCILLATING SPRAY PATTERN," which is incorporated by reference herein, in the entirety and for all purposes.

FIELD

Disclosed are high-performance nozzles, and more particularly, to nozzles and nozzle assemblies that induce an oscillating flow.

BACKGROUND

Nozzles may be used to establish a spray pattern that changes over a spray cycle. This may allow a flow fluid from the nozzle to alternate between different targets and/or for the spray pattern itself to change configuration, intensity, or shape. In many traditional systems, fluid is subjected to a series of substantially flat or consistently contoured surface as it traverses through the nozzle and to an outlet. For example, conventional nozzles may have a channel with a constant diameter that directs fluid to the outlet and/or otherwise have components with walls extending along a direction substantially perpendicular to a direction of the motive fluid. This construction may limit the adaptability of the nozzle, including limiting the materials and manufacturing method available to produce the nozzle. As such, the need continues for systems and techniques to facilitate manufacturing and performance of alternating spray pattern nozzles and associated assemblies.

SUMMARY

Embodiments of the present disclosure are directed to a nozzle assembly for establishing an alternating spray pattern, such as an oscillating spray pattern. The nozzle assembly includes one or more tapered surfaces. The one or more tapered surfaces may be used to direct fluid toward an outlet for delivering an oscillating spray pattern. The tapered surfaces may also facilitate manufacturing of one or more components of the nozzle assembly, including facilitating manufacturing such components using an injection molding process.

In one embodiment, a nozzle assembly is disclosed. The nozzle assembly includes a stator member having a stator surface that defines a progressing cavity. The nozzle assembly further includes a rotor member in the progressing cavity. The rotor member includes at least one rotor lobe engaged with the stator surface. The progressing cavity has at least two stator cavities adapted for at least partially receiving the at least one lobe and defining an oscillatory movement of the rotor member in response to a flow of a motive fluid through the progressing cavity. The nozzle assembly further comprises a spray member associated with the rotor member and configured for movement with the oscillatory movement of the rotor member. The spray member includes a spray inlet, a nozzle outlet, and a through portion extending between the spray inlet and the nozzle outlet. The nozzle assembly further includes a cap seating the spray member adjacent the stator and defining a port that remains fluidly coupled with the nozzle outlet during the movement of the spray member. The rotor member, the spray member, and the cap cooperate to direct the motive fluid along a tapered surface of the nozzle assembly and deliver an oscillatory spray of the motive fluid therefrom.

In another embodiment, a nozzle includes a housing defining a housing inlet, a housing outlet, and an interior volume extending between the housing inlet and the housing outlet. The nozzle assembly further includes a rotor member in the interior volume. The rotor member includes at least one rotor lobe engaged with a stator surface that extends substantially between the housing inlet and the housing outlet. The stator surface includes at least two stator cavities adapted for at least partially receiving the at least one lobe and for defining an oscillatory movement of the rotor member in response to a motive fluid from the housing inlet to the housing outlet. The nozzle assembly further includes a spray member associated with the rotor member at or adjacent to the housing outlet and configured for movement with the oscillatory movement of the rotor member. The spray member includes a spray inlet, a nozzle outlet, and a through portion extending between the spray inlet and the nozzle outlet. The nozzle assembly further includes a cap seating the spray member at the housing outlet and defining a port that remains fluidly coupled with the nozzle outlet during the movement of the spray member. The rotor member, the spray member, and the cap cooperate to direct the motive fluid along a tapered surface of the nozzle assembly between the housing inlet and port and deliver an oscillatory spray of the motive fluid therefrom.

In another embodiment, the stator surface can define the tapered surface of the nozzle assembly such that a first stator cavity of the at least two cavities and a second stator cavity of the at least two cavities are of different sizes. The rotor member can be an elongated member extending between the housing inlet and the housing outlet and along the stator surface. In this regard, the rotor member can define a complementary tapered surface with the stator surface such that a cross-sectional area of the rotor member changes between the housing inlet and the housing outlet.

In another embodiment, the nozzle assembly can further include a stator member defining the stator surface. The stator member can be adapted to receive the rotor member therein, with the stator member being seated within the interior volume of the housing. The housing can include an interior housing wall that defines the interior volume. The interior housing wall can define the tapered surface of the nozzle assembly.

In another embodiment, the rotor member can define a first joint member that is arrangeable at or adjacent the housing outlet when the rotor member is assembled within the housing. Further, the spray member can define a second joint member that is connected to the first joint member. This can allow for multi-degree articulation of the spray member with the oscillatory movement of the rotor member. The spray member can includes an interior spray member wall that defines the through portion, with the interior spray member wall defining the tapered surface of the nozzle assembly. In some cases, the first joint member can include a ball joint and the second joint member can include a receiving socket. The ball joint can be received within the receiving socket for the multi-degree articulation of the spray member with the oscillatory movement of the rotor member while the spray inlet remains substantially unimpeded by the rotor member. The nozzle outlet can be configured to induce a fan-shaped flow from the nozzle assembly.

In another embodiment, a nozzle assembly includes a stator member having a stator surface that defines at least two stator cavities of a progressing cavity extending through the stator member. The stator member further includes a rotor member arranged in the progressing cavity and having a rotor surface that defines at least one lobe. The at least one lobe is adapted for engagement with the at least two stator cavities. The rotor member is configured to rotate within the progressing cavity. The engagement of the at least one lobe with the at least two stator cavities is adapted to cause an oscillatory movement of the rotor member within the stator member during a rotation of the rotor member. The nozzle assembly further includes a spray member configured to receive a flow of fluid from the progressing cavity and emit the flow of fluid from the nozzle assembly as a spray. The spray member is connected to the rotor member and moveable by the rotor member during the rotation of the rotor member. The spray emitted from the spray member shares an oscillation pattern of the rotor member. The stator surface and the rotor surface are complementary tapered surfaces of the nozzle assembly.

In another embodiment, the nozzle assembly can further include a housing defining a housing inlet, a housing outlet, and an interior volume extending between the housing inlet and the housing outlet. As such, the stator member can be seated within the interior volume of the housing and extend between the housing inlet and the housing outlet.

In another embodiment, the housing can include an interior housing wall that defines the interior volume. The stator member can include a first flange and a second flange. The first and second flanges can be arranged at opposing ends of the stator member and configured for engagement with the interior housing wall. The interior housing wall can taper between the housing inlet and the housing outlet.

In another embodiment, the rotor member can include at least two lobes, serially arranged along a longitudinal axis of the rotor member. The rotor member can have a first cross-sectional area at a first lobe of the at least two lobes. Further, the rotor member can have a second cross-sectional area at a second lobe of the at least two lobes. The first and second cross-sectional areas can be different from one another, thereby defining a taper of the rotor member. In a particular implementation, the first lobe is arrangeable adjacent the housing inlet and the second lobe is arrangeable adjacent the housing outlet, with the second cross-sectional area being greater than the first cross-sectional area.

In another embodiment, the spray member has a spray inlet, a nozzle outlet, and a through portion extending between the spray inlet and the nozzle outlet. In this configuration, the through portion can taper between the spray inlet and the nozzle outlet.

In another embodiment, a method of manufacturing a nozzle assembly includes molding a stator member from a first injection moldable material. The stator member includes a stator surface that defines at least two stator cavities of a progressing cavity extending through the stator member. The method further includes molding a rotor member from a second injection moldable material. The rotor member having a rotor surface that defines at least one lobe configured for rotatable engagement with the at least two stator cavities of the progressing cavity. The method further includes molding a spray member from a third injection moldable material. The spray member is configured for operable coupling with the rotor member and having a through portion for receiving a flow of fluid and emitting the flow of fluid form the nozzle assembly as a spray. At least one of the stator member, the rotor member, or the spray member defines a tapered surface of the nozzle assembly.

In another embodiment, the first injection moldable material, the second injection moldable material, and the third injection moldable material can be a common type of injection moldable material.

In another embodiment, the stator surface can define the tapered surface of the nozzle assembly. Further, the tapered surface can be one of a plurality of tapered surface of the nozzle assembly. Each of the stator member, the rotor member, and the spray member can define one or more tapered surfaces of the plurality of tapered surface of the nozzle assembly.

In another embodiment, the method can include inserting the rotor member within the progressing cavity and operatively connecting the spray member with the rotor member.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 1A depicts a cleaning operation with a spray system in a first configuration according to implementations of the present disclosure;

FIG. 1B depicts the cleaning operation of FIG. 1A with the spray system in a second configuration according to implementations of the present disclosure;

FIG. 1C depicts detail 1C-1C of the spray system of FIG. 1B, including a nozzle assembly with a oscillatory spray being emitted therefrom according to implementations of the present disclosure;

FIG. 2 depicts a side view of a nozzle assembly according to implementations of the present disclosure;

FIG. 3 depicts a top view of the nozzle assembly of FIG. 2;

FIG. 4 depicts a bottom view of the nozzle assembly of FIG. 2;

FIG. 5 depicts an exploded view of the nozzle assembly of FIG. 2;

FIG. 6 depicts a cross-sectional view of a housing of the nozzle assembly of FIG. 5, taken along line 6-6 of FIG. 5 according to implementations of the present disclosure;

FIG. 7 depicts a cross-sectional view of a stator arranged within the nozzle assembly of FIG. 5, taken along line 6-6 of FIG. 5 according to implementations of the present disclosure;

FIG. 8 depicts a side view of a rotor of the nozzle assembly of FIG. 5 according to implementations of the present disclosure;

FIG. 9A depicts a cross-sectional view of the rotor of FIG. 8, taken along line 9A-9A of FIG. 8;

FIG. 9B depicts a cross-sectional view of the rotor of FIG. 8, taken along line 9B-9B of FIG. 8;

FIG. 9C depicts a cross-sectional view of the rotor of FIG. 8, taken along line 9C-9C of FIG. 8;

FIG. 9D depicts a cross-sectional view of the rotor of FIG. 8, taken along line 9D-9D of FIG. 8;

FIG. 10 depicts a cross-sectional view of a rotor arranged within the nozzle assembly of FIG. 5, taken along line 6-6 of FIG. 5 according to implementations of the present disclosure;

FIG. 11 depicts a cross-sectional view of a spray member arranged within the nozzle assembly of FIG. 5, taken along line 6-6 of FIG. 5 according to implementations of the present disclosure;

Figure 1A:
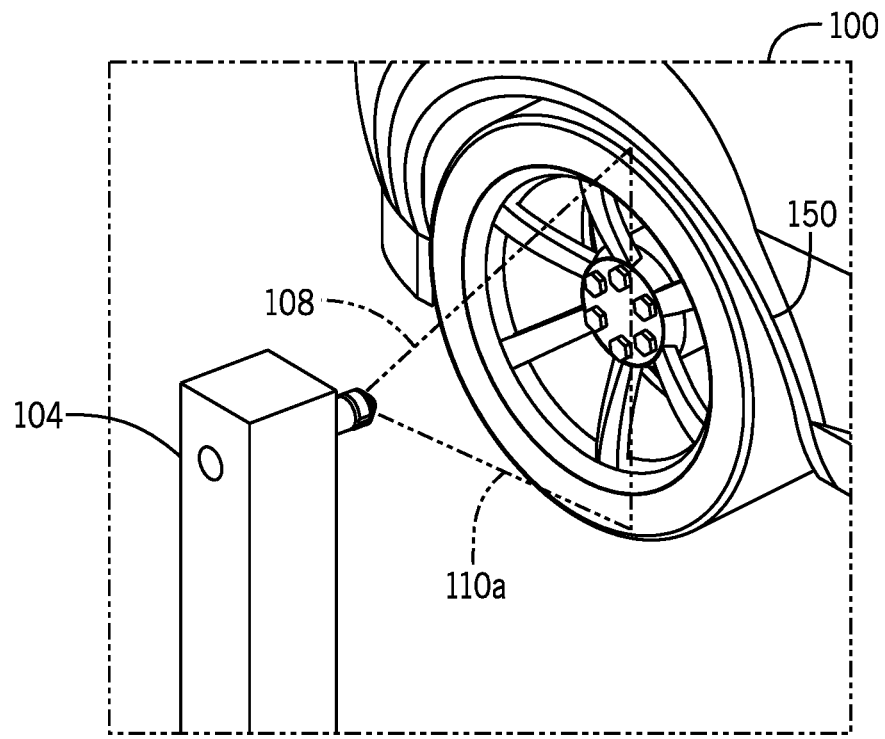

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes systems, methods, and apparatuses that embody various elements of the present disclosure. However, it should be understood that the described disclosure may be practiced in a variety of forms in addition to those described herein.

Disclosed herein are nozzle assemblies adapted to establish a fluid spray pattern that changes over time and that includes one or more tapered surfaces. Broadly, nozzle assemblies may direct a motive fluid to a spray member where the fluid is emitted from the nozzle assembly. The motive fluid may move with the spray member, thereby allowing the spray member to change a direction of the motive fluid, or otherwise alter a characteristic of the fluid emitted from the nozzle, such as a shape, intensity, configuration, and so on. However, directing motive fluid through the nozzle assembly using substantially constant diameter channels or via components that otherwise run substantially parallel to the direction of motive fluid through the assembly may impede spray performance and limit the manufacturability of the assembly to inefficient processes and materials.

The nozzle assemblies, systems, and methods of manufacture of the present disclosure may mitigate such hindrances by producing a nozzle assembly having one or more tapered surfaces, along which the motive fluid is directed during an oscillating spray operation. In this way, fluid may propagate through the nozzle assembly without necessarily traversing or traveling adjacent to a channel of constant diameter along a longitudinal axis of the assembly. The tapered surfaces may be present in multiple engagement components, including embodiments where the nozzle assembly defines complementary tapered surfaces moveable relative to one another for establishing the oscillatory spray.

To facilitate the foregoing, the nozzle assembly may include a housing having an interior volume through which fluid moves through to generate a spray. The interior volume may be defined by interior housing walls having one or more tapered surfaces. A stator member may be arranged within the interior volume of the housing. The stator member may have an exterior adapted to engage the interior housing walls, including engaging the one or more tapered surfaces defining the interior volume of the housing. In other examples, the housing may be optional or not required, with the stator member adapted to perform one or more functions of the housing. For example, the stator member can be a structural member of the nozzle assembly that defines an outer, external surface of the nozzle assembly. The stator member can thus also be adapted to fluidly couple the nozzle assembly to an external fluid source, including a fluid connection that structurally attaches the nozzle assembly to the external source.

The stator member may include a progressing cavity therethrough defined by a stator surface. Within the progressing cavity, a rotor member may be arranged. The rotor member may have a rotor surface that is engageable with the rotor surface. For example, the stator surface may define two or more stator cavities or scoops or recesses serially arranged and coupled along a longitudinal axis of the stator member such that the rotor can move therebetween. The rotor surface may define a lobe adapted for engagement with the cavities to cause an oscillatory movement of the rotor member within the stator member during a rotation of the rotor member. The stator surface and the rotor surface may each include one or more tapered surfaces. In some cases, this may include the stator and rotor surface being complementary tapered surfaces of the nozzle assembly such that a degree of tapering is the same between these complementary tapered surfaces. Motive fluid is advanced substantially between the complementary tapered surfaces of the rotor and stator members to facilitate emission of the fluid from the assembly as a spray.

Other components of the nozzle assembly may also be tapered in addition to or in the alternative to the tapered surfaces of the housing, rotor member, and stator member. For example, the nozzle assembly may include a spray member associated with the rotor member for complementary movement therewith. The spray member may be adapted to receive the motive fluid from the progressing cavity, and to emit the fluid from the nozzle as a spray, such as an oscillatory spray. The spray member may include one or more tapered surfaces, and the motive fluid may be directed along the one or more tapered surfaces of the spray member. The tapered surfaces, for example, may include a through portion of the spray member that reduces in size as the motive fluid moves toward a nozzle outlet of the spray member. The spray member may be seated in a cap that closes the housing at the spray member. The cap may include one or more tapered surface, which in some cases may facilitate engagement of the cap with the one or more tapered surfaces of the housing.

Methods of manufacturing of the nozzle assembly are also disclosed. The one or more tapered surfaces of the nozzle assembly may facilitate manufacturing of the assembly. For example, the one or more tapered surface may be used to define a molding draft contour of one or more of the components of nozzle assembly. The molding draft contour may facilitate the manufacturing of the nozzle assembly via one or more injection molding processes. The injection molding process may use various injection moldable materials, including resins, plastics, synthetics, and so on. This may simplify manufacturing and in some cases support smaller, more compact configurations of the assembly, such as configurations of the rotor having one or two or three lobes for compact installation in spray systems of car washes, as one example.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1B:
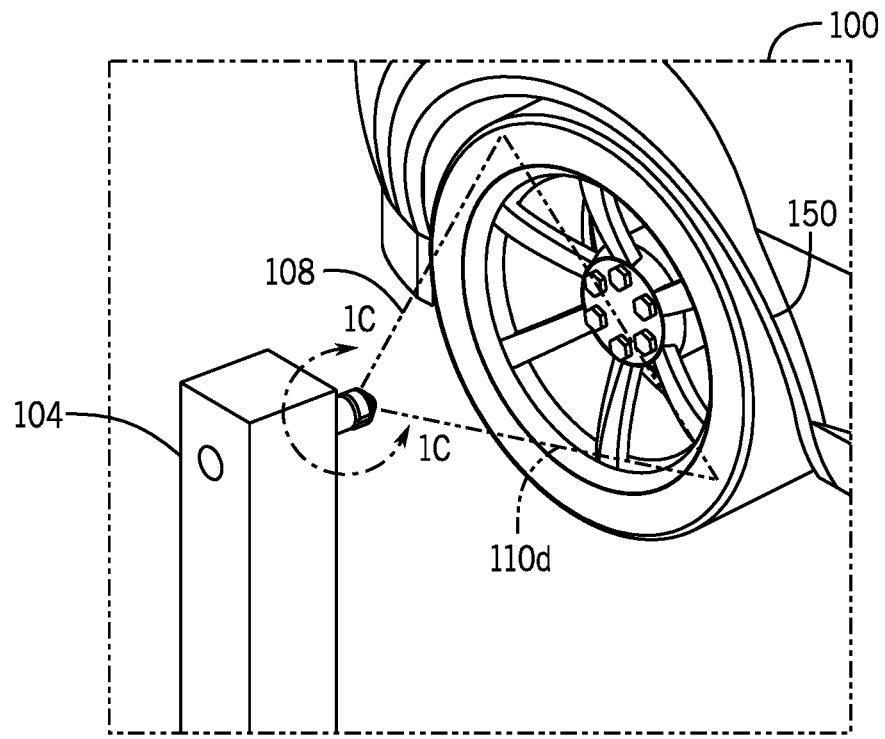

FIGS. 1A and 1B depict a cleaning operation 100 according to implementations of the present disclosure. The cleaning operation 100 involves a spray system 104 that is used to direct a spray 108 toward a vehicle 150. The spray 108 can be a high-pressure spray of fluid. Additionally or alternatively, the spray 108 can include a fan of foam that casts a vertical line of application on the target. The spray system 104 may therefore be used to clean the vehicle 150 in a car wash environment, as shown in FIGS. 1A and 1B. The spray system 104 may therefore be used to apply foam on an object, for instance, to clean or shine the vehicle 150 in a car wash environment, as shown in FIGS. 1A and 1B. In other cases, the cleaning operation 100 may occur in other settings, including those for cleaning tooling, appliances, or other systems or implements. For example, the spray system 104 may be a substantially permeant fixture of a car wash or other wash station. Additionally or alternatively, the spray system 104 may be implemented as a removable attachment for mobile cleaning operations. For example, the spray system 104 can be implemented as a hand-held or hand-operated wand. In this regard, in addition to the car wash applications described herein, the spray system 104 can be used in other settings, such as in industrial cleaning and excavation cleaning systems, among other options, in which a wand may facilitate cleaning.

The spray system 104 is generally used to establish an oscillatory pattern of the spray 108. The spray 108 can include a fan of foam that casts a vertical line of application on the target. In FIG. 1A, the spray 108 is shown at a first orientation 110a. The spray system 104 may cause the spray 108 to move or otherwise be altered. In FIG. 1B, the spray 108 is shown in a second orientation 110b. The second orientation 110b may represent a rotary or non-rotary change in orientation of the spray 108, for example, based on the configuration of the spray system 104. For purposes of illustration, the spray 108 is shown as a generally fan-shaped pattern. In other cases, the spray 108 may resemble other shapes, including substantially concentrated flow patterns, including flow patterns defining by a consistent, smooth laminar flow, as may be appropriate for a given application. Multiple sprays can also be provided, for example, using a bank of nozzle assemblies. The bank of nozzles can be mounted on an arch of a vehicle wash tunnel. In some cases, while the orientation of the spray is altered, the ends of the path may generally be a straight line as the spray oscillates.

Figure 1C:
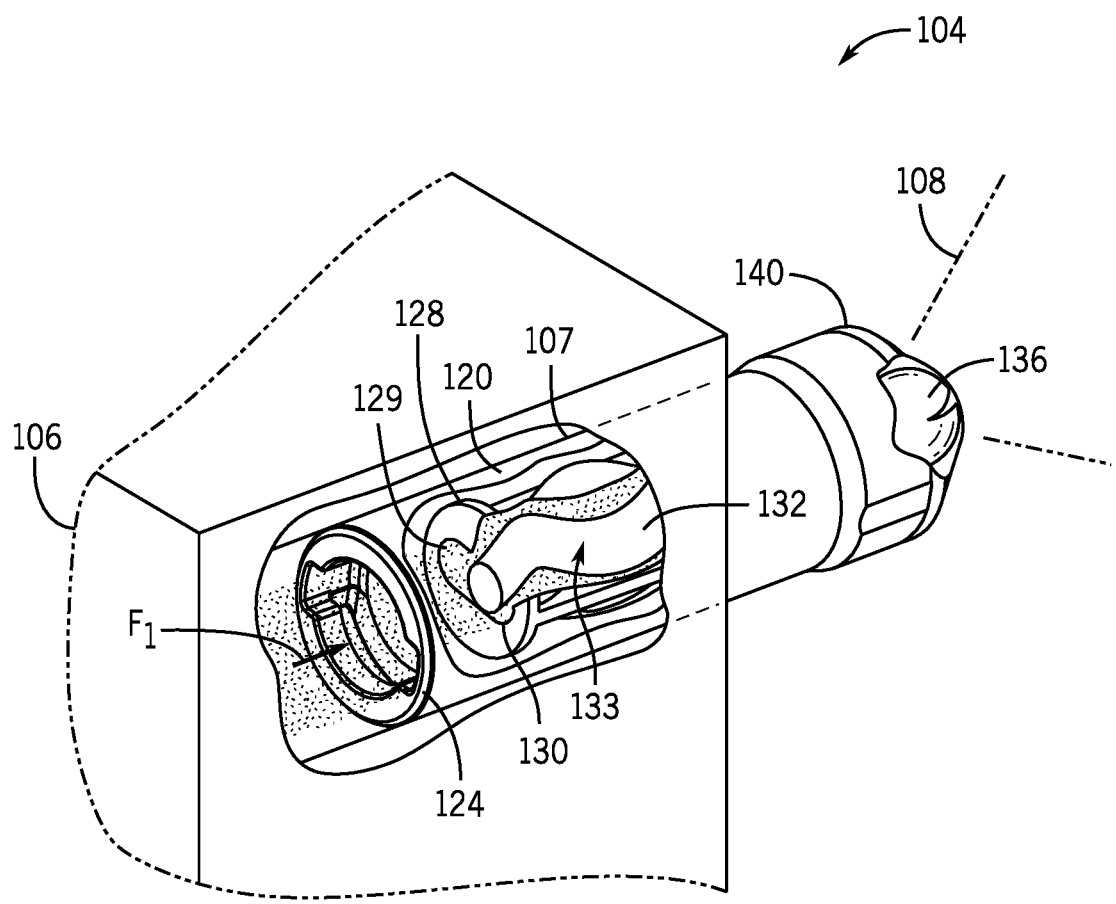
Figure 2:
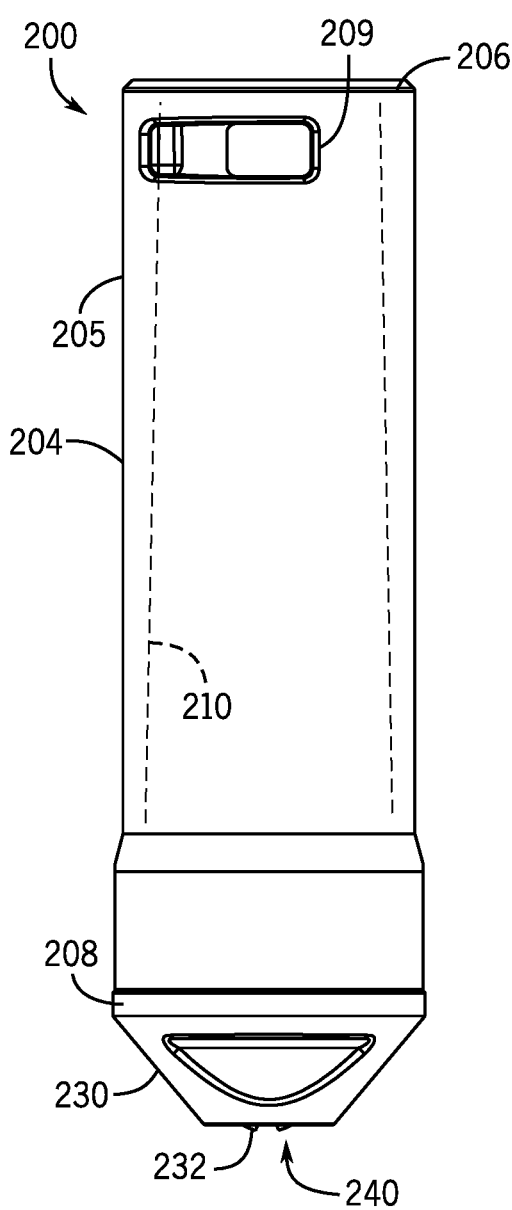
Figure 3:
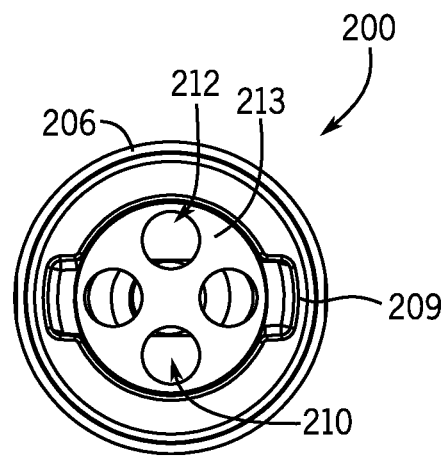
Figure 4:
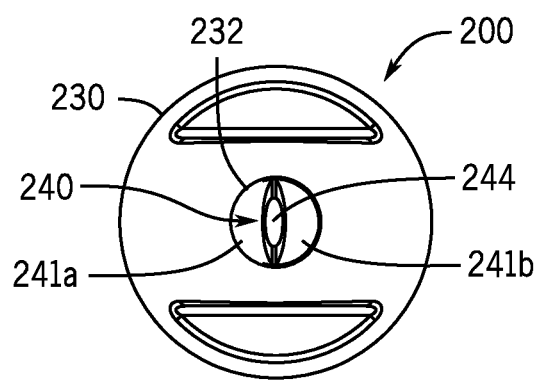

The spray system 104 may include a nozzle assembly in order to deliver an oscillatory patterns of the spray 108 to the vehicle 150. With reference to FIG. 1C, detail 1C-1C of FIG. 1B is shown including a nozzle assembly 120 of the spray system 104, such as the nozzle assemblies discussed described in greater detail herein. The nozzle assembly 120 may generally be configured to receive a motive fluid $F_1$ and manipulate the motive fluid $F_1$ in a manner that produces the spray 108 and causes the spray 108 to oscillate, including moving the spray 108 in an optionally non-rotary type pattern. The nozzle assembly 120 generally includes one or more tapered surfaces for directing motive fluid $F_1$ into the spray 108.

In the example of FIG. 1C, the spray system 104 includes a mounting structure 106. The mounting structure 106 may be an installation in the car wash environment. The nozzle assembly 120 is seated within the mounting structure 106 via a receiving slot 107 of the mounting structure 106, and the nozzle assembly 120 may be fluidly connected to a motive fluid $F_1$. A source of the motive fluid $F_1$ may be from a plumbed connection in the car wash environment. In other embodiments, the motive flow $F_1$ may be from a hose, tank, and/or other optionally portable fluid source. The motive fluid $F_1$ may include water. Additionally or alternatively, the motive fluid $F_1$ may contain a mixture of water and soaps, detergents, degreasers, or other solutions that may facilitate a cleaning operation. The nozzle assembly 120 may therefore be constructed from one or more corrosion-resistant materials, such an injection moldable plastic or plastic-based materials, so that the nozzle assembly 120 may deliver an oscillatory spray of fluids containing, as one example, chemicals that facilitate cleaning.

To facilitate delivery of an oscillatory flow, the nozzle assembly 120 may receive the motive fluid $F_1$ at a fluid ingress at a proximal end of the housing 124 of the nozzle assembly 120. The housing 124 may include one or more tapered surfaces, such as one or more tapered surfaces of an interior housing wall of the housing 124, as shown in the figures. As discussed in connection with FIG. 6, the tapered surfaces may define a narrower interior housing wall of the housing 124 at a proximal end where fluid enters the nozzle assembly 120, and a relatively wider interior housing wall at a distal end where fluid exits the nozzle assembly 120. Where the interior of the housing 124 is tapered, the stator member 128 may have one or more external features that are adapted to match a contour of the housing 124 and/or have a reduced, including a step-wise reduction in, diameter, to seat the stator member 128 within the housing 124.

The stator member 128 may define a progressing cavity 130 for receiving the motive fluid $F_1$. FIG. 1C, also shows a rotor member 132 within the progressing cavity 130. The rotor member 132 may be adapted to rotate within the progressing cavity 130. For example, as motive fluid $F_1$ moves through the progressing cavity 130 movement of the rotor member 132 is induced relative to the stator member 128. Surface geometries of the stator member 128 and the rotor member 132 may define the movement of the rotor member 132 as an oscillatory movement. For example and as described in greater detail herein, the stator member 128 may include a stator surface 129 having multiple stator cavities along a longitudinal axis of the nozzle assembly 120. The rotor member 132 may include a rotor surface 133 having multiple lobes that are adapted for engagement within, including being at least partially received by, one or more lobes of the stator surface 129. As the motive fluid $F_1$ impacts that stator cavities and lobes, localized pressure changes are induced in the progressing cavity 130, causing the movement of the rotor member 132 within the stator cavities. In some cases, the stator surface 129 and the rotor surface 133 may be complementary tapered surfaces that allows the rotor member 132 to turn within the stator member 128 and relative to the stator surface 129. With both the stator surface 129 and the rotor surface 133 being complementary tapered surfaces, the rotor member 132 may better match a geometry of the progressing cavity 130 for more consistent, repeatable turning of the rotor member 132 therein. This can help establish a predefined flow pattern for the spray 108, in contrast to rotor member 132 departing from the geometry of the progressing cavity 254, which could result in a more choppy or unpredictable movement of the spray 108.

Figure 5:
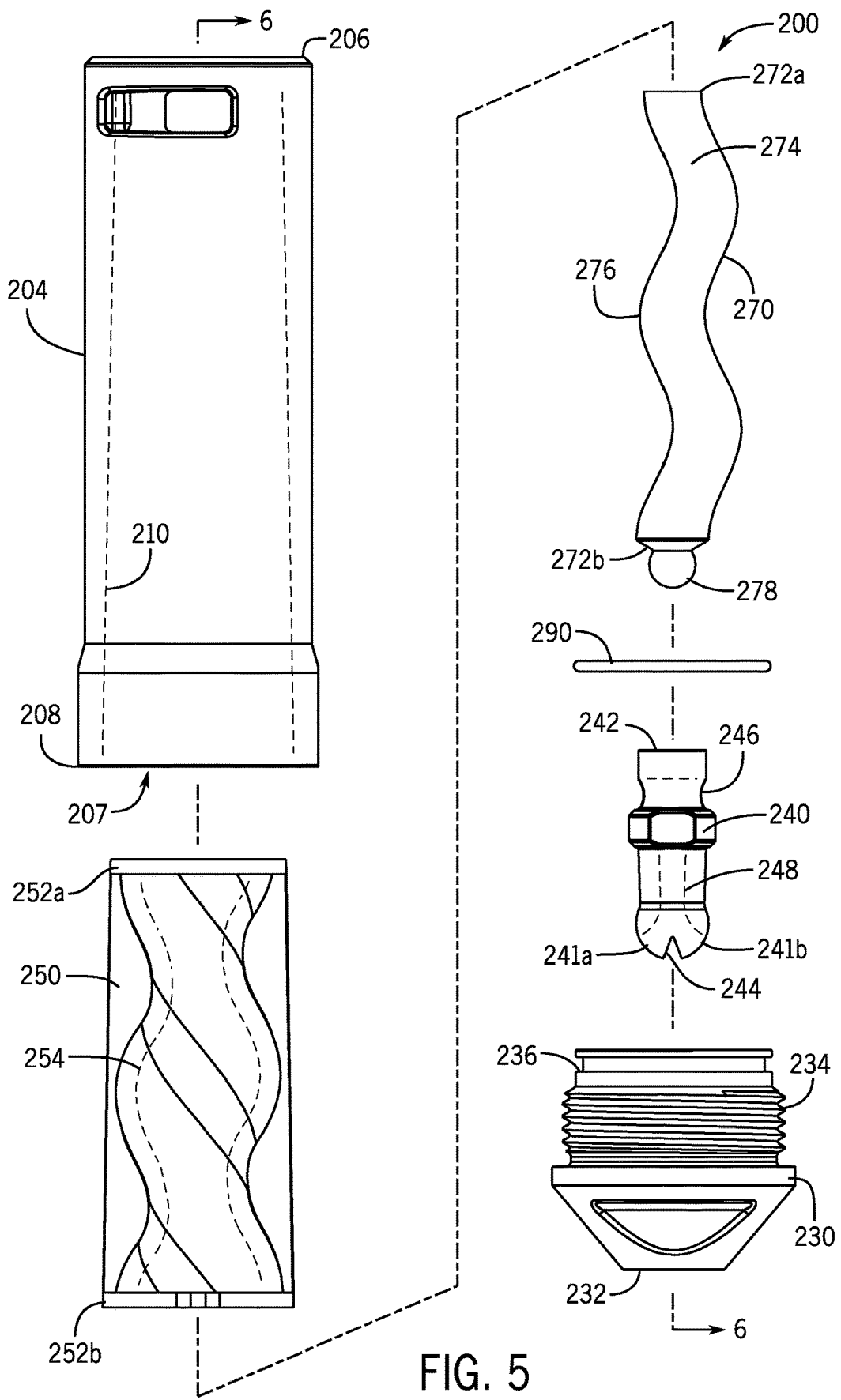

The motive fluid $F_1$ may be transferred from the progressing cavity 130 and into a nozzle outlet 136. The nozzle outlet 136 may be operatively coupled with the rotor member 132. As rotor member 132 moves within the progressing cavity 130, a distal end of the rotor member 132 may engage with an cause a corresponding or complementary movement of the nozzle outlet 136. The nozzle outlet 136 is configured to receive the motive fluid $F_1$ and the emitted motive fluid $F_1$ as a spray 108. Accordingly, an orientation of the spray 108 may be influenced by the movement of the nozzle outlet 136, which in turn, may be influenced by movement of the rotor member 132, and more specifically, the engagement of the rotor member 132 and stator member 128 along the progressing cavity 130.

Shown in phantom in FIG. 1C, the nozzle outlet 136 is seated at a cap 140 of the nozzle assembly. The cap 140 defines an egress port through which the spray 108 is emitted. The cap 140 closes the housing 124 opposite the mounting structure 106. The cap 140 and/or the nozzle outlet 136 may also define the one or more tapered surfaces of the nozzle assembly 120. As one example, the interior of the nozzle outlet 136 may be tapered, thus reducing the cross-sectional area of the passage through which the motive fluid $F_1$ traverses as the flow is manipulated into the spray 108. The cap 140 may be tapered correspondingly, including having one or more tapered surfaces in order to match the one or more tapered surfaces of the housing 124.

It will be appreciated that while the example of FIG. 1C is described with respect to an embodiment of the nozzle assembly with a housing, this is for purposes of illustration. As described in greater detail below with respect to FIG. 14, the nozzle assemblies of the present disclosure can be free or absent an external housing, with the stator member defining the outer, external surface of the nozzle assembly and fluid connection. Accordingly, the spray system 104 can implement alternative embodiments of the nozzle assembly, including that of FIG. 14, without departing from the scope or spirit of the invention.

FIG. 2 depicts a side view of a nozzle assembly 200 according to implementations of the present disclosure. The nozzle assembly 200 may be substantially analogous to the nozzle assembly 120 described above with respect to FIGS. 1A-1C. For example, the nozzle assembly 200 may receive a motive fluid and manipulate the motive fluid into a spray having an oscillatory pattern.

In the side view of FIG. 2, the nozzle assembly 200 is shown as including a housing 204. The housing 204 may including a housing body 205 that defines a housing inlet 206 and a housing outlet 208. The housing body 205 may also define one or more attachment structures 209. The attachment structures may include openings, grooves, latches, and/or other mechanisms that operate to releasably secure the nozzle assembly 200 to an external mounting structure (e.g., the mounting structure 106 of FIG. 1C). Within the housing 204, an interior volume 210 may be defined. The interior volume 210 may generally extend between the housing inlet 206 and the housing outlet 208. The housing inlet 206 may be configured to receive the motive fluid, such as from a plumbed connection of a car wash system. The motive fluid may be advanced through the interior volume 210 and to the housing outlet 208.

The interior volume 210 of the housing outlet 208 may be closed by a cap 230. The cap 230 may be releasably connected to the housing outlet 208 at the housing outlet 208. The cap 230 may define a port 232 through which the motive fluid of the interior volume is emitted from the nozzle assembly 200. Seated at the port 232 is a nozzle outlet 240 of the nozzle assembly 200. As described in greater detail below, the nozzle outlet 240 may be configured to manipulate the motive fluid of the interior volume 210 for emission of the motive fluid as a spray from the nozzle assembly 200. This may include manipulating both a shape of the motive fluid (e.g., to define a fan-type shape or other shape of the flow) and/or an orientation and movement of the motive fluid, including the oscillatory movements described herein.

With reference to FIG. 3, a top view of the nozzle assembly 200 of FIG. 2 is shown. The top view of FIG. 3 shows the housing inlet 206. At or adjacent to the housing inlet 206 a series of four passages 212 are depicted. The series of passages 212 may be holes or other through portions defined through a plate 213. The plate 213 may separate the interior volume 210 of the housing 204 from an external environment. Through this the motive fluid into the interior volume 210 is controlled at least partially by the series of passages 212, including a quantity of the passages and size of each. In this regard, while FIG. 3 shows the plate having four passages of substantially equal size, in other cases, more or fewer passages, including passages of larger and/or smaller sizes may be used. The plate 213 is shown concentrically arranged with relative to an exterior surface of the housing body 205. The plate 213 may also be recessed from an end-most portion of the housing body 205, e.g., distal end of the housing body 205 proximate the housing inlet 206. This allows the motive fluid to at least partially enter the housing 204 prior to traversing the plate 213. Attachment structure 209 is also shown in the top view of FIG. 3.

With reference to FIG. 4, a bottom view of the nozzle assembly 200 is shown. The bottom view shows the nozzle outlet 240 seated at the port 232 that is defined by the cap 230. The nozzle outlet 240 may include a first tip portion 241*a* and a second tip portion 241*b*. Between the first tip portion 241*a* and the second tip portion 241*b*, the nozzle outlet 240 defines an orifice 244 for fluid egress. The nozzle assembly 200 is adapted to emit motive fluid at the orifice 244 and define a spray. The first and second tip portions 241*a*, 241*b* cooperate to define the contour of the orifice and influence the shape of the spray. In the example of FIG. 4, the first and second tip portions 241*a*, 241*b* may be substantially symmetrical halves that define the orifice 244 as an elongated v-shaped cut. This configuration may cause the spray to have a fan-type shape. In other cases, other nozzle configurations may be used, including where the nozzle outlet 240 is adapted to emit the spray as a consistent, smooth, and/or substantially laminar flow.

FIG. 5 depicts an exploded view of the nozzle assembly 200. In the exploded view of FIG. 5, the housing 204, the cap 230, and nozzle outlet 240, as described, are depicted. FIG. 5 also depicts that nozzle assembly 200 including a stator member 250, a rotor member 270 and a seal member 290. The nozzle assembly 200 includes one or more tapered surfaces. The one or more tapered surfaces may be defined by any one of, or a combination of, or all of the housing 204, the stator member 250, the rotor member 270, the nozzle outlet 240, and/or the cap 230, as explained in greater detail below.

The stator member 250 may be adapted for receipt by the housing 204 in the interior volume 210. The stator member 250 may include a first stator end 252a and a second stator end 252b. The stator member 250 may be inserted into the interior volume 210 such that the first stator end 252a is arranged at or adjacent the housing inlet 206, and further such that the second stator end 252b is arranged at or adjacent the housing outlet 208. The interior volume 210 of the housing 204 may be defined by one or more tapered surfaces. In this regard, the cross-sectional area of the interior volume 210 may increase along the longitudinal axis of the housing 204 between the housing inlet and the housing outlet 208. To seat the stator member 250 in the interior volume 210, the first stator end 252a may therefore have a cross-dimension that is different than a cross-dimension than the second stator end 252b. As one example, the first stator end 252a may be defined by a first flange having a first diameter, and the second stator end 252b may be defined by a second flange having a second diameter. The second diameter may be greater than the diameter of the first flange so as to match or generally following the contour of the tapered surface that defines the interior volume 210 of the housing 204.

The stator member 250 may operate to guide movement of the rotor member 270 within the nozzle assembly 200. For example, the stator member 250 may define a progressing cavity 254 (shown in phantom in FIG. 5) that extends substantially between the first and sends stator ends 252a, 252b. The progressing cavity 254 may have a taper or otherwise have a cross-sectional area that changes along a length of the stator member 250. The rotor member 270 may be received within the progressing cavity 255 and allowed to rotate or otherwise move therein.

The rotor member 270 is shown in FIG. 5 as a substantially elongated member having a first rotor end 272a and a second rotor end 272b. The elongated rotor member 270 may be have having bends, waves and/or a spiral shape, and may have a solid construction composed of a polymer, metal, or composite. In some implementations, the rotor member 270 may be free of channels or other openings that permit fluid flow. The rotor member 270 may be arranged within the progressing cavity 254 such that the first rotor end 272a is at or adjacent the first stator end 252a, and such that the second rotor end 272b is at or adjacent the second stator end 252b. The rotor member 270 may define a rotor surface 274. The rotor surface 274 may have a taper. For example, the rotor member 270 may have a cross-dimension that changes along a length of the rotor member 270. In some cases, the rotor surface 274 and an interior surface of the stator member that defines the progressing cavity 254 may be complementary tapered surfaces. The rotor surface 274 may define at least one rotor lobe 276. The rotor lobe 276 is arranged substantially between the first rotor end 272a and the second rotor end 272b. The rotor lobe 276 is arrangeable within the progressing cavity 254 of the stator member 250. As described in greater detail with respect to FIGS. 13A and 13B, the rotor lobe 276 may be adapted for engagement with an interior surface of the stator member to facilitate and/or guide movement of the rotor member 270 within the progressing cavity 254 in response to receiving a motive fluid therethrough.

Figure 13A:
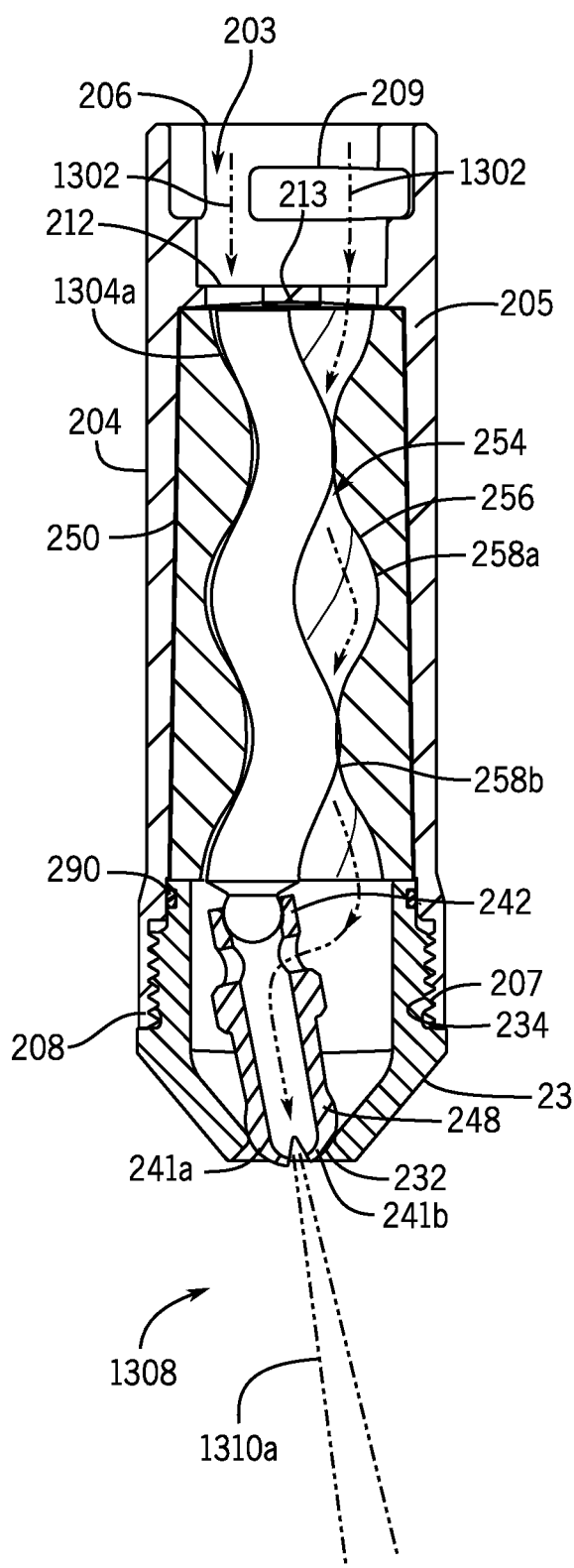
FIG. 13A depicts the nozzle assembly of FIG. 5 in a first configuration according to implementations of the present disclosure.
Figure 13B:
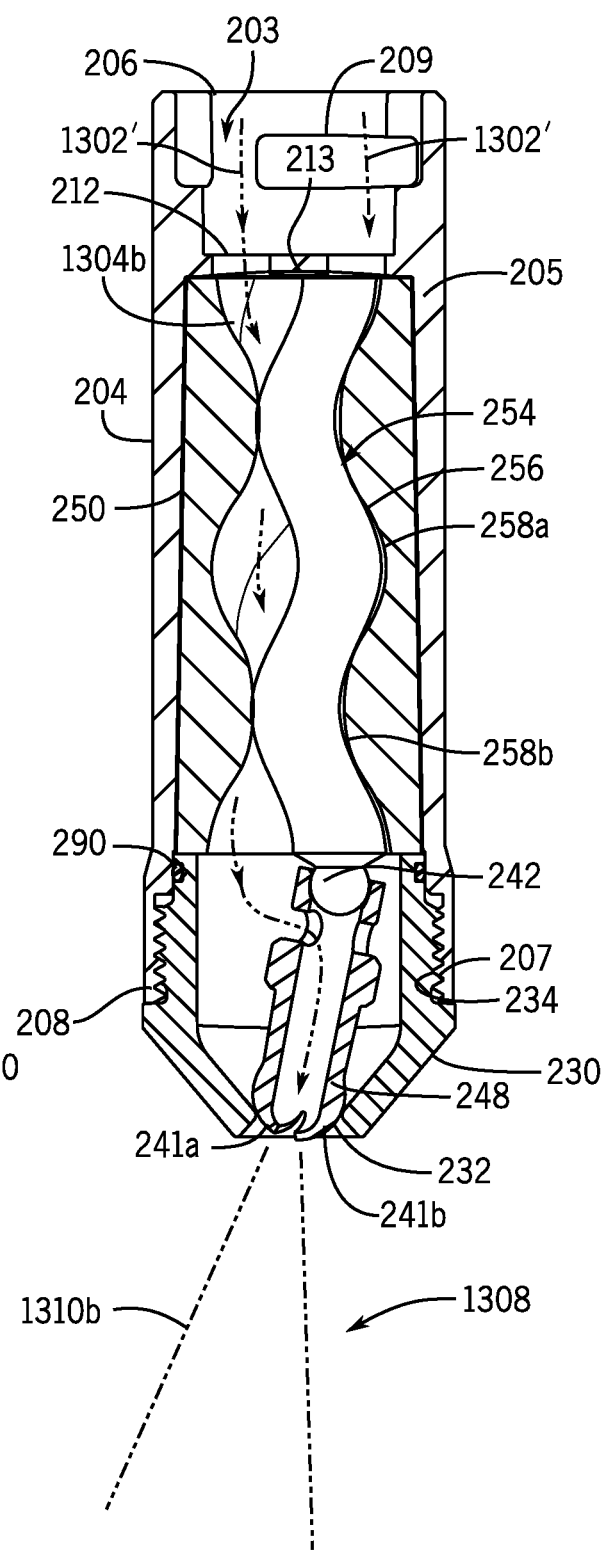
FIG. 13B depicts the nozzle assembly of FIG. 5 in a second configuration according to implementations of the present disclosure.

The rotor member 270 is shown in FIG. 5 with a first joint member 278. The first joint member 278 may be used to operatively couple the nozzle outlet 240 and the rotor member 270 to one another. In this regard, the nozzle outlet 240 is shown with a second joint member 242. The first and second joint members 278, 242 may be releasably engaged with one another. With the releasable engagement of the rotor member 270 and the nozzle outlet 240, the nozzle outlet 240 may be restricted from moving away from the rotor member 270. Notwithstanding, the first and second joint members 278, 242 may cooperate to allow for relative movement of the nozzle outlet 240 and the rotor member 270. As one example, the first joint member 278 may include a ball joint and the second joint member 242 may include a receiving socket. The ball joint may be at least partially received in the receiving socket such that the nozzle outlet 240 may maintain multi-axis movement relative to the rotor member 270. As such, as the rotor member 270 moves within the progressing cavity 254, the nozzle outlet 240 may move in a corresponding or complementary manner due in part to the releasable coupling of the first and second joint members 278, 242, as shown in FIGS. 13A and 13B. In other examples, the first joint member 278 may include a socket and the second joint member 242 may include a ball joint. In other examples, other attachment techniques are possible.

The nozzle outlet 240 also includes the nozzle outlet or orifice 244, a spray inlet 246, and a through portion 248 (shown in phantom in FIG. 5). The spray inlet 246 is configured to receive a motive fluid from the progressing cavity 254. For example, the spray inlet 246 may include a series of holes along an exterior of the nozzle outlet 240 that receive the motive fluid. The holes may generally be arranged to face a direction that is substantially perpendicular to a longitudinal axis of the nozzle assembly 200. In some cases, the series of holes of the spray inlet 246 may be circumferentially spaced along the exterior surface of the nozzle outlet 240 and about the longitudinal axis.

The spray inlet 246 is fluidly connected to the through portion 248 such that the spray inlet 246 directs the motive fluid into the through portion 248. The through portion 248 is fluidly connected to the nozzle outlet or orifice 244. The through portion 248 may channel or otherwise direct the motive fluid to the orifice 244 where the motive fluid is emitted from the nozzle assembly 200 as a spray. The nozzle outlet 240 may have one or more tapered surfaces that define the through portion 248. In this regard, a cross-sectional area of the through portion 248 may decrease between the spray inlet 246 and the nozzle outlet or orifice 244. The through portion 248 may therefore optionally define a restriction between the spray inlet 246 and orifice 244.

The cap 230 may be adapted for releasable engagement with the housing 204. In the exploded view of FIG. 5, the cap 230 is shown with external threads 234. The threads 234 may facilitate releasable engagement of the cap 230 and the housing 204. For example, the housing 204 may include complementary internal threads 207 (FIG. 6) at or adjacent the housing outlet 208. In one example, the cap 230 may be at least partially inserted into the housing 204 and may be rotated therein in order to establish a threaded engagement between the cap 230 and the housing 204.

The cap 230 and the housing 204 may in some instances establish a fluid resistant or leak-proof connection therebetween. In this regard, the nozzle assembly 200 of FIG. 5 includes a seal member 290. The seal member 290 may be an O-ring adapted to be received by a ring groove 236 of the cap 230. As such, the cap 230 may be releasably coupled with the housing 204, and the sealing element 290 may establish a barrier between fluid in the interior volume 210 of the housing 204 and an external environment.

Figure 6:
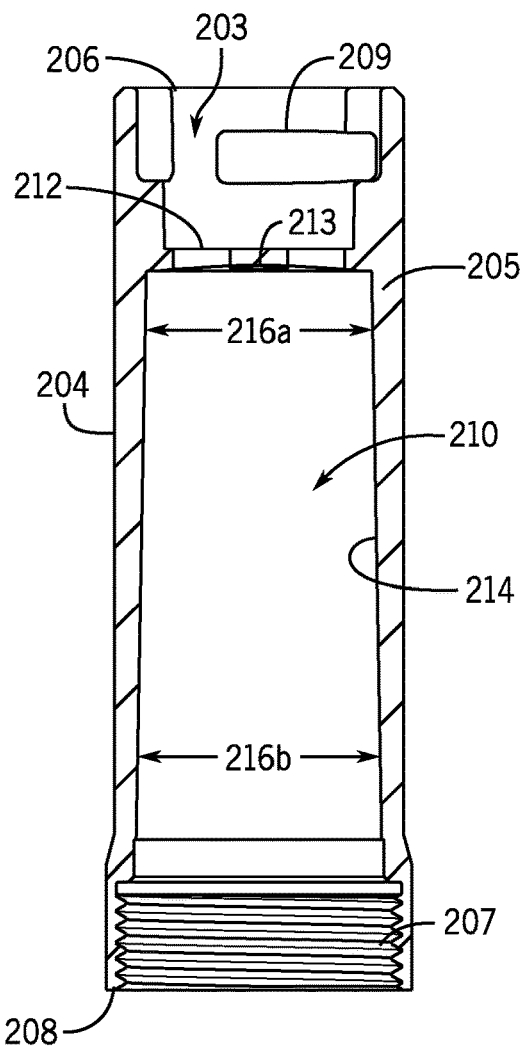

FIG. 6 depicts a cross-sectional view of the housing 204 of the nozzle assembly 200 of FIG. 5, taken along line 6-6 of FIG. 5. In FIG. 6, the interior volume 210 of the housing 204 is shown as being defined by an interior housing wall 214. The interior housing wall 214 may be a tapered component or surface of the nozzle assembly 200. As one example, at or adjacent the housing inlet 206, the interior volume 210 may have a first width 216a. Further, at or adjacent the housing outlet 208, the interior volume 210 may have a second width 216b. The second width 216b may be different than the first width 216a. For example, the second width 216b may be greater than the first width 216a. As such, the cross-sectional area of the interior volume 210 may gradually increase between the housing inlet 206 and the housing outlet 208.

FIG. 6 also shows the plate 213 and series of passages 212 at least partially recessed from the housing inlet 206. For example, the housing 204 may include a recessed portion 203 arranged substantially between the housing inlet 206 and the plate 213 and the series of passages 212. In some cases, the recessed portion 203 may be adapted to receive a component of a fluid delivery system that delivers the motive fluid to the nozzle assembly 200. For example, the recessed portion 203 may be a fitting that is operable to establish a fluidic coupling between a fluid source (e.g., a plumbed connection, a hose, and so on), and the interior volume 210. In some cases, this may be facilitated by the attachment structures 209. For example, a plumbed connected or hose could be at least partially inserted into the housing 204 at the recessed portion 203 and secured therein via a connection established by the attachment structures 209.

Figure 7:
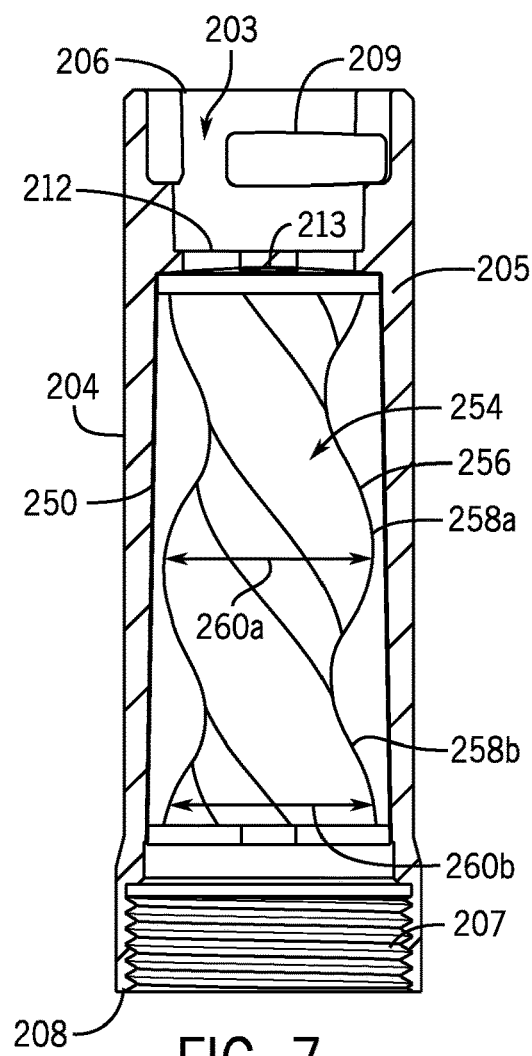

FIG. 7 depicts a cross-sectional view of the stator member 250 arranged within the nozzle assembly 200 of FIG. 5, taken along line 6-6 of FIG. 5. In the cross-sectional view of FIG. 7, the progressing cavity 254 is shown as being defined by a stator surface 256. The stator surface 256 may generally extend between the first stator end 252a, and the second stator end 252b (FIG. 5). The stator surface 256 may be adapted to substantially encircle the rotor member 270 when the rotor member 270 is arranged within the progressing cavity 254. The stator surface 256 may also be adapted to engage the rotor 270 and rotor surface 274 as the rotor 270 operates within the progressing cavity 254. For example, the stator surface 256 may include a first stator cavity 258a and the second stator cavity 258b configured for the rotor 270 to operate within each cavity 258a, 258b and move therebetween. The first and second stator cavities 258a, 258b may be adapted to engage, for example, the one or more lobes of the rotor surface 274 in order to establish a pattern of movement between the rotor member 270 and the stator member 250 in response to motive fluid through the progressing cavity 254.

As shown in FIG. 7, the progressing cavity 254 may have a taper. For example, the stator surface 256 may include one or more tapered surfaces of the nozzle assembly 200. In this regard, a cross-sectional area of the progressing cavity 254 may change along the longitudinal axis of the nozzle assembly 200. As an illustration, FIG. 7 shows the progressing cavity 254 having a first width 260a at the first stator cavity 258a. FIG. 7 also shows the progressing cavity 254 having a second width 260b at the second stator cavity. The second width 260b may be different than the first width 260a. In the example of FIG. 7, the second width 260b may be greater than the first width 260a. As such, a cross-sectional area of the progressing cavity 254 may increase along the longitudinal axis of the nozzle assembly 200 between the housing inlet 206 and the housing outlet 208.

Figure 8:
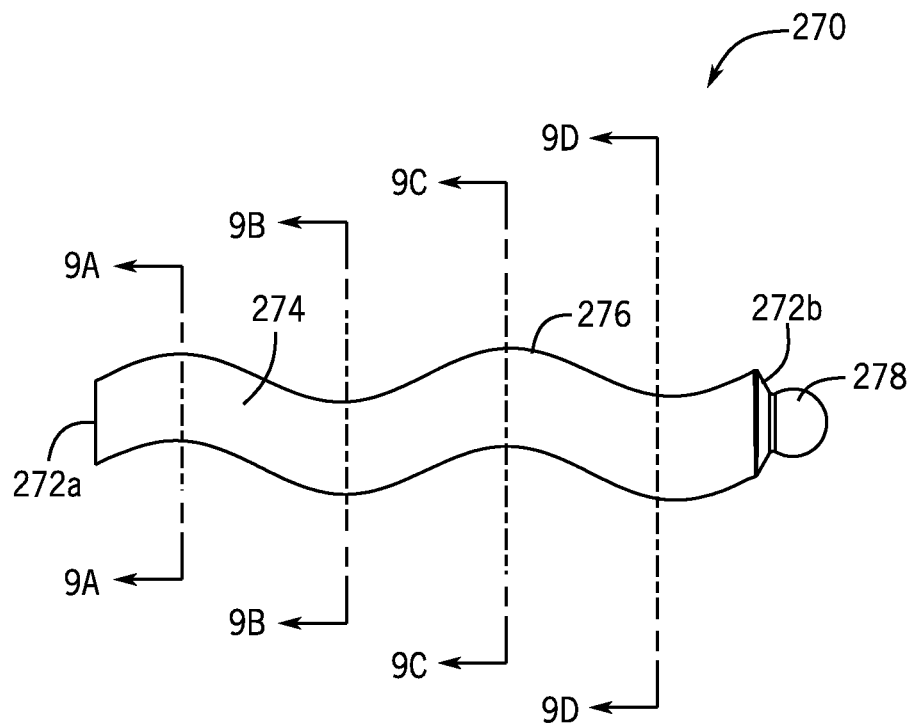

With reference to FIG. 8, a side view of the rotor member 270 is shown. As described above, the rotor member 270 may define one or more tapered surfaces of the nozzle assembly 200. In this regard, the rotor surface 274 may be used to define a gradually increasing or decreasing geometry of the rotor member 270. The first rotor end 272a and the second rotor end 272b opposite the first rotor end 272a may therefore have a different size or otherwise define a different cross-sectional area of the rotor member 270. While many configurations are possible, in the example of FIG. 8 the rotor member 270 may be a tapered surface that the first rotor end 272a is generally smaller than the second rotor end 272b. For example, at the first rotor end 272a the rotor member 270 have a first cross-sectional area, and at the second rotor end 272b the rotor member 270 may have a second cross-sectional area that is greater than the first cross-sectional area. The rotor surface 274 may therefore be a tapered surface of the nozzle assembly 200 that extends from the first rotor end 272a to the second rotor end 272b.

Figures 9A, 9B, 9C, 9D:
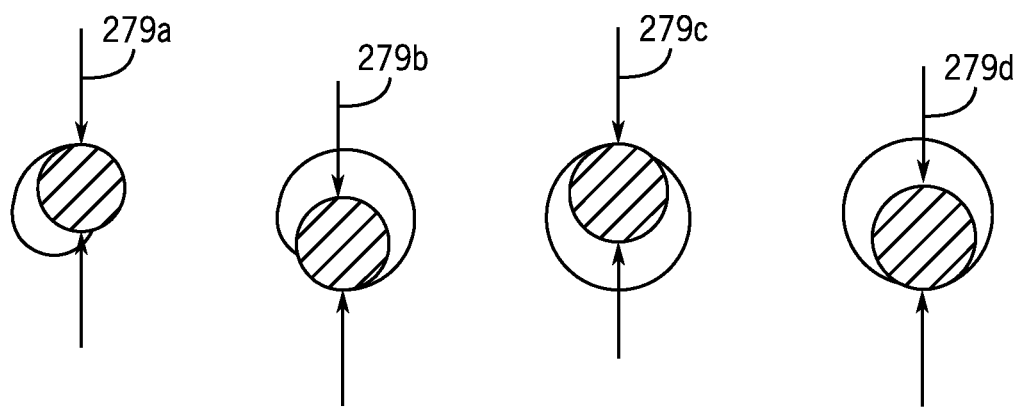

As an illustration, FIG. 9A depicts a cross-sectional view of the rotor member 270 of FIG. 8, taken along line 9A-9A of FIG. 8. Line 9A-9A is taken at or adjacent to the first rotor member end 272a and where the rotor member 270 has a first cross-sectional area 279a. With reference to FIG. 9B, a cross-sectional view of the rotor member 270 of FIG. 8 is shown, taken along line 9B-9B of FIG. 8 and where the rotor member 270 has a second cross-sectional area 279b. With reference to FIG. 9C, a cross-sectional view of the rotor of FIG. 8 is shown, taken along line 9C-9C of FIG. 8 and where the rotor member 270 has a third cross-sectional area 279c. With reference to FIG. 9D, a cross-sectional view of the rotor member 270 of FIG. 8 is shown, taken along line 9D-9D of FIG. 8 and where the rotor member 270 has a fourth cross-sectional area 279d. Line 9D-9D is taken at or adjacent the second rotor member end 272b.

As depicted in FIGS. 9A-9D, the second cross-section area 279b is greater than the first cross-sectional area 279a. Further, the third cross-sectional area 279c is greater than the second cross-sectional area 279b. Further, the fourth cross-sectional area 279d is greater than the third cross-sectional area 279c. Accordingly, the rotor surface 274 may be tapered between the first rotor end 272a and the second rotor end 272b, thereby accommodating the change in the cross-sectional area of the rotor member from the first cross-sectional area 279a to the further cross-sectional area 279d. This tapered of the rotor surface 274 may be one of a set complementary tapered surfaces defined by the rotor member 270 and the stator member 250. The tapering of the rotor member 270 may be gradual and the rotor surface 274 may define a smooth, uninterrupted surface that is free of abrupt narrowing features, such as steps.

Figure 10:
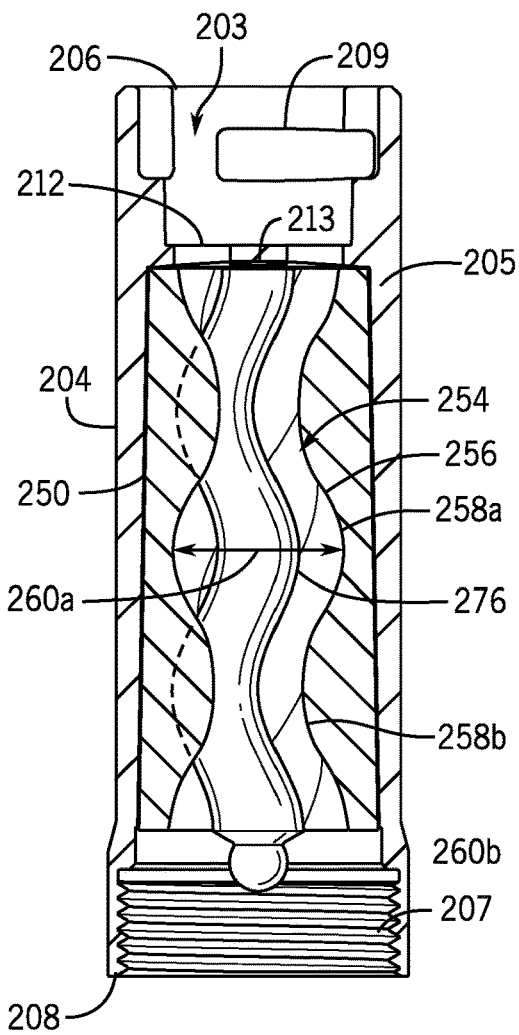

Turning to FIG. 10, a cross-sectional view of the rotor member 270 is shown arranged within the nozzle assembly 200 of FIG. 5, taken along line 6-6 of FIG. 5. The rotor member 270 is arranged within the progressing cavity 254. The rotor member 270 may be substantially free to rotate or otherwise move about a longitudinal axis of the nozzle assembly 200 within the progressing cavity 254. The rotor member 270 and the stator member 250 may engage and contact one another in order to define or otherwise establish a pattern of movement of the rotor member 270 within the progressing cavity 254. As one example, the lobe 276 may be adapted to be at least partially received by one or more stator cavities of the stator member 250, such as the first stator cavity 258a and the second stator cavity 258b. For example and as shown in FIGS. 13A and 13B, fluid may enter the nozzle assembly 200 and induce localized changes in pressure in the progressing cavity 254 around the rotor member 270. The localized changes in pressure may induce a rotational movement of the rotor member 270. In turn, the lobes 276 may be received by and directed along one or more of the stator cavities of the stator member 250. The geometry of the stator cavities 258a, 258b and the lobes 276 may be tuned so that the engagement of the lobes 276 and the cavities 258a, 258b may cause an oscillatory movement of the rotor member 270.

Figure 11:
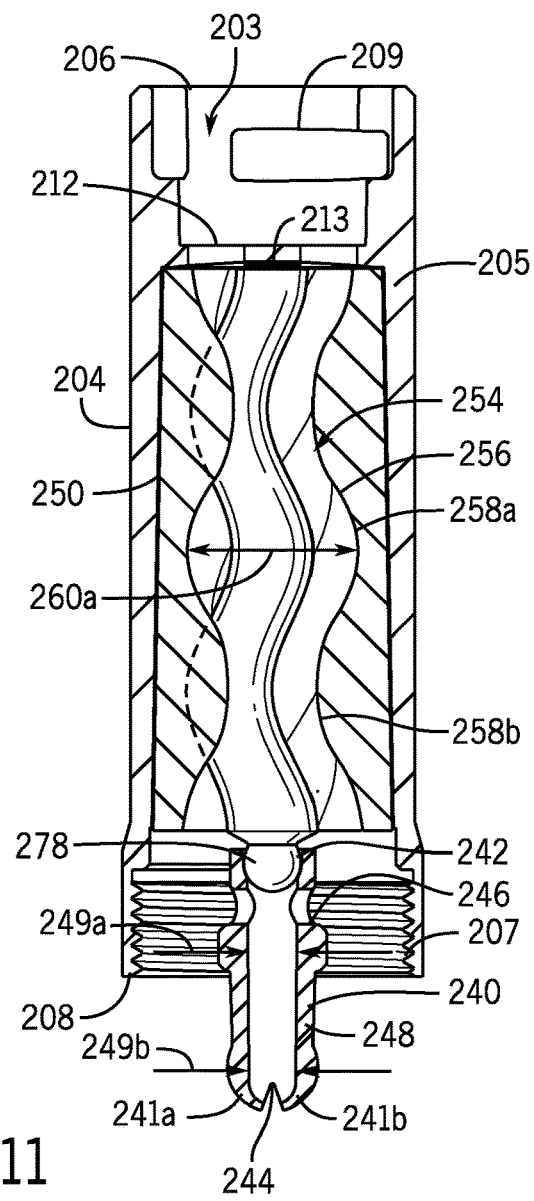

With reference to FIG. 11, a cross-sectional view of the nozzle outlet 136 is shown arranged within the nozzle assembly 200 of FIG. 5, taken along line 6-6 of FIG. 5. The nozzle outlet 136 is shown in FIG. 11 connected to the rotor member 270. For example, the rotor member 270 may define the first joint member 278 and the nozzle outlet 240 may define the second joint member 242. In FIG. 11, the first joint member 278 and the second joint member 242 are operably coupled to one another. This may allow for multi-degree articulation of the nozzle outlet 240 with the oscillatory movement of the rotor member 270. In the example of FIG. 11, the first joint member 278 includes a ball joint and the second joint member 242 includes a receiving socket. The ball joint is received at least partially within the receiving socket. This operable coupling may allow for the corresponding oscillatory movement while the spray inlet 246 remains substantially unimpeded by the rotor member 270 and is capable of receiving the motive fluid therethrough.

As described herein, the nozzle outlet 240 may define one or more tapered surfaces of the nozzle assembly 200. For example, the through portion 248 may extend between the spray inlet 246 and the nozzle outlet 244 and be tapered therebetween. In this regard, a cross-dimension of the through portion 248 may gradually reduce establishing a slight or gradual fluid restriction for the motive fluid propagating through the nozzle outlet 240. In the example of FIG. 11, the nozzle outlet 240 is shown having as first cross-dimension 249a in the through portion 248 at or adjacent the spray inlet 246. The nozzle outlet 240 is further shown having a second cross-dimension 249b in the through portion 248 at or adjacent the nozzle outlet 244. The first cross-dimension 249a may be greater than the second cross-dimension as the through portion 248 reduces in width between the spray inlet 246 and the nozzle outlet 244. In other cases, however, it is contemplated that the first cross-dimension 249a could be less than the second cross-dimension 249b, as may be appropriate based on the requirements or parameters of a desired spray and spray pattern.

Figure 12:
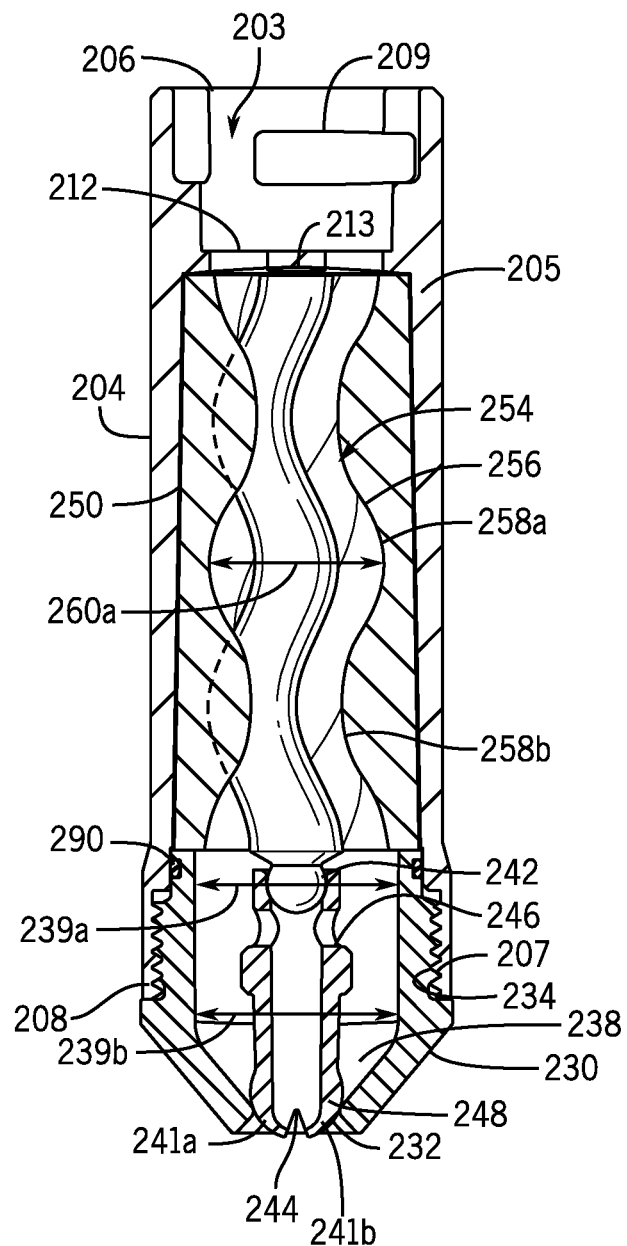
FIG. 12 depicts a cross-sectional view of the nozzle assembly of FIG. 5 in a fully assembled configuration, taken along line 6-6 of FIG. 5 according to implementations of the present disclosure.

Turning to FIG. 12, a cross-sectional view of the nozzle assembly 200 of FIG. 5 in a fully assembled configuration, taken along line 6-6 of FIG. 5. In the fully assembled configuration, the cap 230 is associated with the housing 204. The cap 230 may be releasably coupled to the housing 204 at the housing outlet 208. As described, this may be accomplished using the threads 234 of the cap 230 and the complementary threads 207 of the housing 204. The threads 234 and the complementary threads 207 are shown in FIG. 12 as being threadably engaged with one another. The threaded engagement, or other releasable engagement, of the housing 204 and the cap 230 may be used to seal or other otherwise establish a fluid resistant boundary at the housing outlet 208. In some cases, this may be facilitated by the seal member 290 shown in FIG. 12. This sealing may help direct and contain fluid in housing 204 for entry of the fluid into the nozzle outlet 240.

As described herein, the cap 230 may define one or more tapered surfaces of the nozzle assembly 200. In the embodiment of FIG. 12, the cap 230 may define a cap interior 238. The cap interior 238 may be adapted to receive motive fluid from the progressing cavity 254. The cap interior 238 may extend from the progressing cavity 254 to the port 232. The nozzle outlet 240 is seatable at the port 232 and allowed to move relative thereto. The motive fluid from the progressing cavity 254 may flow along one or more tapered surfaces of the nozzle assembly 200 that is defined by the cap 230. For example, the cap interior 258 may have a different cross-dimension at or adjacent the progressing cavity 254 than by the port 232. With specific reference to FIG. 12, the cap interior 258 is shown as having a first cross-dimension 239a adjacent the progressing cavity 254. The cap interior 258 is further shown as having a second cross-dimension 239b adjacent the port 232. In the particular example of FIG. 12, the first cross-dimension 239a may be greater than the second cross-dimension 239b. In other cases, however, it is contemplated that the first cross-dimension 239a could be less than the second cross-dimension 239b, as may be appropriate based on the requirements or parameters of a desired spray and spray pattern.

Turning to FIGS. 13A and 13B, a cross-sectional view of the nozzle assembly 200, as taken along line 6-6 of FIG. 5, is shown in various modes of operation. With reference to FIG. 13A, the nozzle assembly 200 is shown in a first configuration. In the first configuration, the nozzle assembly 200 may emit a spray 1308 having a first orientation 1310a. The nozzle assembly 200 is shown in FIG. 13A receiving a motive fluid 1302 at the housing inlet 206. The motive fluid 1302 enters at the housing inlet 206 and proceeds to the progressing cavity 254. In the progressing cavity 254, the motive fluid 1302 impacts the rotor member 270 and flows between the lobes 276 and stator cavities 258a, 258b as the motive fluid 1302 travels to the nozzle outlet 240. As the motive fluid 1302 impacts the various components and surfaces in the progressing cavity 254, localized pressures changes around the rotor member 270 and cause a turbulent flow in the progressing cavity 254 such that the rotor member 270 moves within the progressing cavity 254 from an initial rotor position 1304a. As described herein, the rotor member 270 and the stator member 250 may cooperate to define the movement of the rotor member 270 as an oscillatory movement, including certain non-rotary movements therein. This movement of the rotor member 270 may cause a corresponding or complementary movement of the nozzle outlet 240. The motive fluid 1302 may be received by the nozzle outlet 240 and be emitted as the spray 1308 based on the orientation of the nozzle outlet 240. For example, the motive fluid 1302 may be received by the spray inlet 246a, travel through the portion 248, and be emitted as the spray 1308 via the nozzle outlet 244. The spray 1308 may exhibit the orientation 1310a shown in FIG. 13A which may correspond to an orientation of the nozzle outlet 240, and as defined by the rotor member 270.

The nozzle 200 may operate to change an orientation of the spray 1308. For example and with reference to FIG. 13B, the nozzle assembly 200 is shown in a second configuration. In the second configuration, the nozzle assembly 200 may emit the spray 1308 having a second orientation 1310b. As depicted in FIG. 13B, the nozzle assembly 200 may receive a motive fluid 1302' which may represent the motive fluid 1302 at time Δt. The motive fluid 1302' may progress through the nozzle assembly 200 and be emitted as the spray 1308, as described, for example with respect to the motive fluid 1302 of FIG. 13. In the configuration of FIG. 13B, the motive fluid 1302' induces a movement of the rotor member 270 to and/or from a second rotor position 1304b as shown in FIG. 13B. In the second rotor position 1304b, the rotor member 270 may cause the nozzle outlet 240 to move corresponding or complementary orientation. The motive fluid 1302' may exit the nozzle assembly 200 as the spray 1308 and at the second orientation 1310b, as defined by the orientation of the nozzle outlet 240. As fluid continues to propagate through the nozzle assembly 200, the rotor member 270 may continue to alternate or oscillate and cause the spray to transition between the first and second orientations 1310a, 1310b and/or other orientations and shapes as may be appropriate for a given application.

Figure 14:
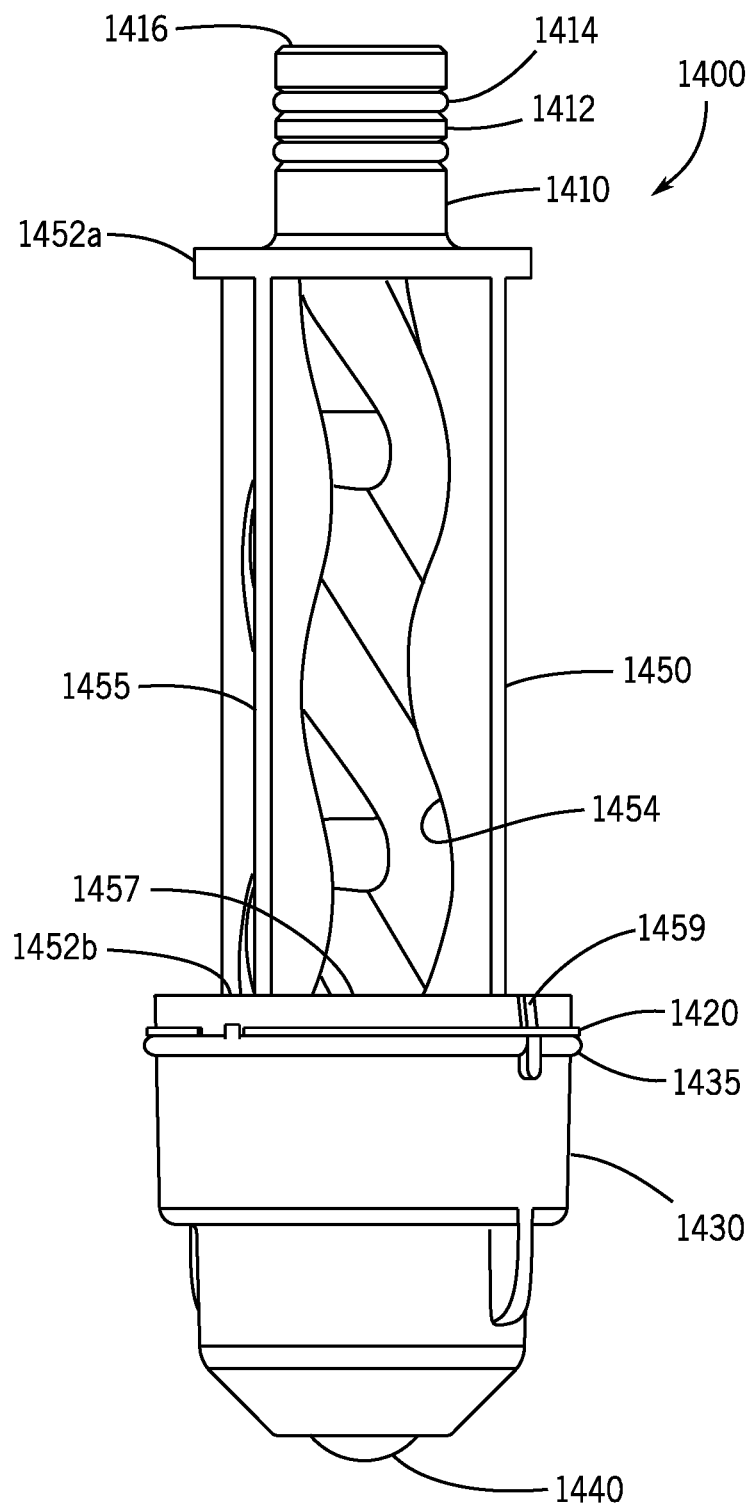
FIG. 14 depicts another example nozzle assembly.

FIG. 14 depicts a nozzle assembly 1400. The nozzle assembly 1400 represents another example illustration of the nozzle assemblies and systems described herein. In this regard, the nozzle assembly 1400 can be adapted to receive a flow of fluid from a fluid source and manipulate and deliver the fluid source as an oscillatory spray. The nozzle assembly 1400 can thus be substantially analogous to any of the nozzle assemblies described herein, including the nozzle assemblies 120 and 200, and can include a stator, a rotor, a nozzle outlet, and a cap. As with the nozzle assemblies 120, 200, the stator, the rotor, the nozzle outlet and the cap can be tapered components, with one or more surfaces defining a tapered or decreasing width.

Notwithstanding the foregoing similarities, the nozzle assembly 1400 of FIG. 14 is constructed free or absent an external housing. For example, whereas the nozzle assemblies 120 and 200 include an external housing, the nozzle assembly 1400 includes a stator 1450 that defines the outer, external surface of the nozzle assembly 1400. In this regard, the stator 1450 can be constructed to perform one or more of the functions of the external housings. In the example of FIG. 14, the stator 1450 includes a fluid connection 1410 that extends elongated from a body of the stator 1450. The fluid connection 1410 can be adapted to removably attach the nozzle assembly 1400 with a fluid source, such a plumbed connection of a carwash or other facility, or a connection to a hose, among other options. The fluid connection 1410 can define a "quick-connect" or other arrangement for streamlined connection and disconnection of the nozzle assembly 1400 to a fluid source. In some cases, the fluid connection 1410 can allow the nozzle assembly 1400 and the external fluid source to remaining connected up to a pressure of at least 250 psig, of at least 350 psig, of at least 450 psig, or greater.

To facilitate the foregoing, the fluid connection 1410 can define an inlet 1416. The inlet 1416 can be fluidly connected to a progressing cavity 1454 that is defined by the stator 1450. The inlet 1416 is adapted to receive fluid from the fluid source such that the fluid is directed into the progressing cavity 1454 for manipulation in to the oscillating flow described herein. The fluid connection 1410 can also define a structural component of the nozzle assembly 1400 that facilitates the removable attachment of the nozzle assembly 1400 to the fluid source and/or other external components that structurally support the nozzle assembly 1400 in a fluid system.

As one example and as illustrated in FIG. 14, the fluid connection 1410 includes a series of grooves 1414 arranged along a structural nose that protrudes from a first stator end 1452a. Sealing elements 1412 are provided and seated in respective ones of the series of grooves 1414. The structural nose can be received by, or otherwise engaged with, a complimentary connection structure of the fluid source. For example, the fluid connection 1410 can be inserted into an external fitting of a fluid source, with the sealing element 1412 establishing a fluid seal with the external fitting. In other examples, other configurations of the fluid connection 1410 are possible, including that in which the fluid connection 1410 is adapted to receive an external fitting, with the sealing elements 1412 disposed therewithin.

As shown in FIG. 14, the stator 1450 defines the outer, external surface of the nozzle assembly 1400. The stator 1450 is shown in FIG. 14 with structural ribs 1455 that span a length of the stator 1450 between the first stator end 1452a and a second stator end 1452b. The structural ribs 1455 can reinforce the stator 1450, increasing the rigidity of the stator 1450, absent an external housing around the stator 1450. The stator 1450 can have a taper between the first and second stator ends 1452a, 1452b. Accordingly, the structural ribs 1455 can be correspondingly tapered between the first and second stator ends 1452a, 1452b.

The stator 1450 is shown in FIG. 14 seated in a cap 1430 with a nozzle outlet 1440 protruding from the cap 1430. The cap 1430 and the nozzle outlet 1440 can be tapered components of the nozzle assembly, as described herein. The cap 1430 can define an attachment region 1457 and the stator 1450 can be received by the cap 1430 at the attachment region 1457. In some cases, the attachment region 1457 can define threads, clips, detents, or other features to secure the stator 1450 to the cap 1430 and/or to more generally facilitate the removable attachment of the nozzle assembly 1400 to an external fitting or system. In other cases, the stator 1450 can be seated directly in the attachment region 1457, and a retaining ring 1420 can be used to removably attach to the stator 1450 to the cap 1430. In the example of FIG. 14, the stator 1450 includes a longitudinal protrusion 1459 that is receivable by a shelf 1435 of the cap 1430. The retaining ring 1420 can be fitted around the cap 1430 and on the shelf 1420, upon the shelf 1435 receiving the longitudinal protrusion 1459. The retaining ring 1420 can be substantially rigid, and sized to snap on to the cap 1430, thereby preventing exit of the stator 1450 during operation of the nozzle assembly 1400.

Figure 15:
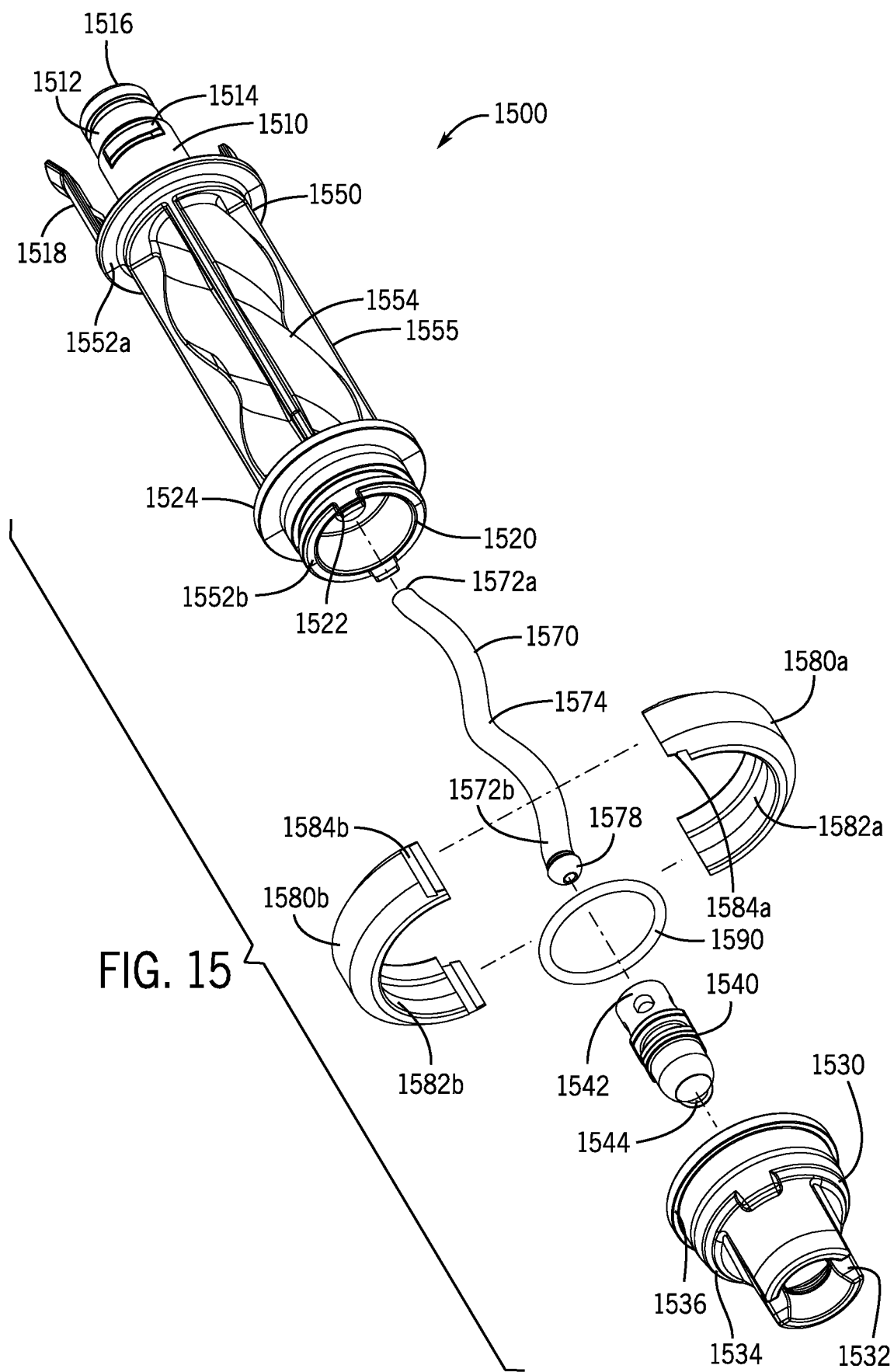
FIG. 15 depicts another example nozzle assembly.
Figure 16:
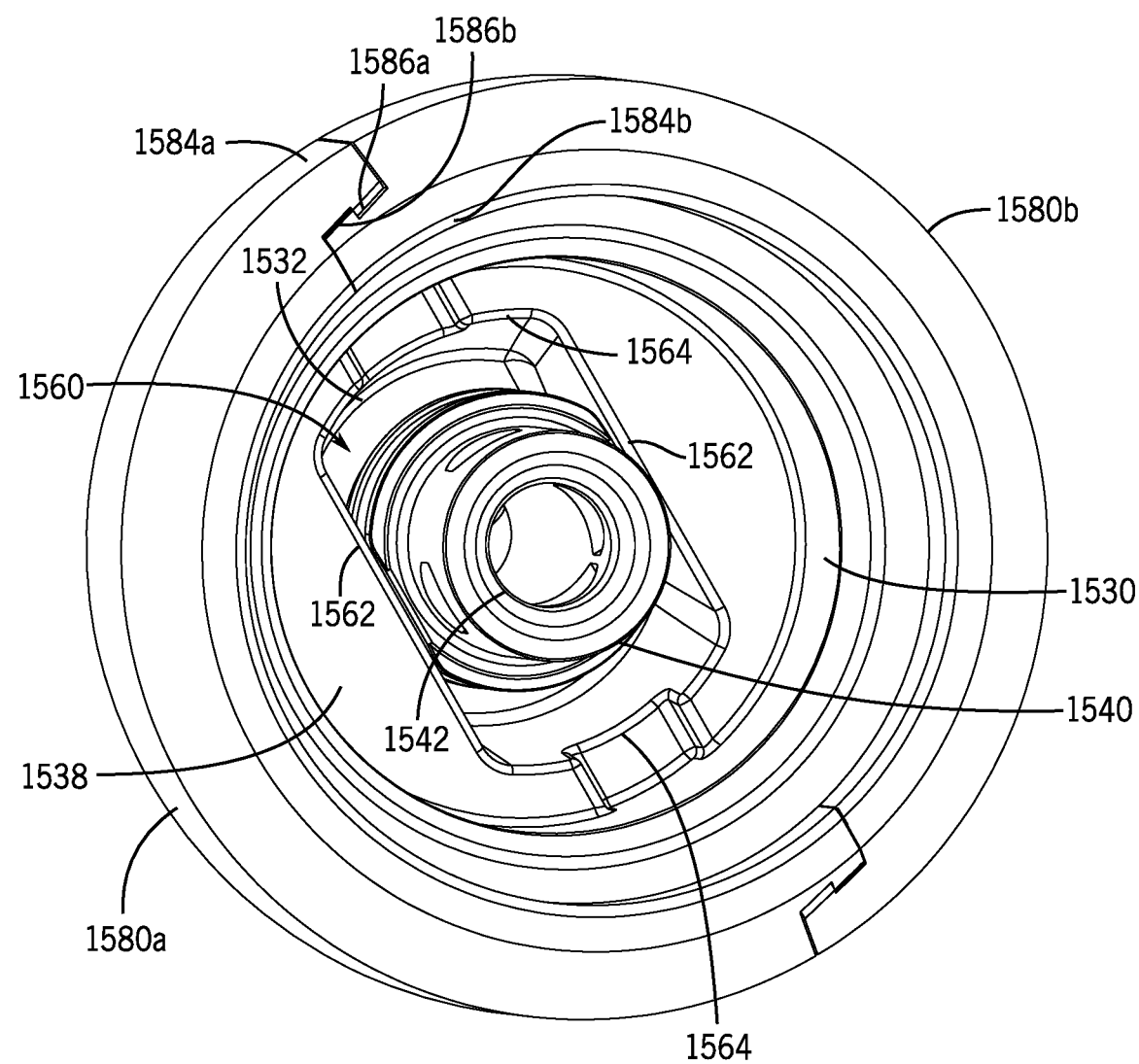
FIG. 16 depicts an interior of the example nozzle assembly of FIG. 15.

Turning to FIGS. 15 and 16, a nozzle assembly 1500 is disclosed. The nozzle assembly 1500 may be constructed free or absent an external housing, similar to the nozzle assembly 1400 of FIG. 14. More broadly, the nozzle assembly 1500 may be adapted to receive a flow of fluid from a fluid source and manipulate and deliver the fluid source as an oscillatory spray. The nozzle assembly 1500 can thus be substantially analogous to any of the nozzle assemblies described herein, including the nozzle assemblies 120, 200, 1400 and can include: a rotor 1570, a rotor surface 1574, a joint member 1578, a first rotor end 1572a, a second rotor end 1572b, a stator 1550, a progressing cavity 1554, structural ribs 1555, a first stator end 1552a, a second stator end 1552b, a fluid connection 1510, a sealing groove 1512, an inlet 1516, a cap or nose cone 1530, a port 1532, a nozzle outlet or spray member 1540, an orifice 1544, a joint member 1542, a seal member 1590. As with the nozzle assemblies 120, 200, 1400, the stator 1550, the rotor 1570, the nozzle outlet 1540 and/or the cap 1530 can be tapered components, with one or more surfaces defining a taper or decreasing width.

Notwithstanding the foregoing similarities, the nozzle assembly 1500 is shown as further including a first collar member 1580a and a second collar member 1580b. The first and second collar members 1580a, 1580b may be configured to couple the stator 1550 to the cap 1530. For example, the first and second collar members 1580*a*, 1580*b* may be configured to define a sealed connection between the stator 1550 and the cap 1530 in order to define a flow path of the motive fluid through the nozzle assembly 1500 for emission at the nozzle outlet 1540.

To facilitate the foregoing, the first and second collar members 1580*a*, 1580*b* may be configured to receive a portion of the stator 1550 and the cap 1530. For example, the stator 1550 may include an engagement plate 1524 and alignment tabs 1522 positioned about a stator outlet 1520. The cap 1530 may include an attachment end 1534 opposite the port 1532 that defines an engagement ring 1536. The stator 1550 may be associated with the cap 1530 by at least partially inserting the alignment tabs 1522 into the cap 1530 at the attachment end 1534. The alignment tabs 1522 may be at least partially deformable and resilient members. The alignment tabs 1522 may therefore flex or bend upon insertion into the attachment end 1534 and exert a force on an interior of cap 1530. The alignment tabs 1522 may be configured to align the cap 1530 with respect to a direction of travel of the rotor 1570 and associated spray member 1540. For example, the alignment tabs 1522 may define a clearance to the cap 1530, such as a clearance to longitudinal walls that define a linear oscillating pattern of the spray member 1540. This clearance may facilitate the movement of the spray member 1540 along the intended oscillating pattern.

The first collar member 1580*a* may define a first receiving portion 1582*a*. The first receiving portion 1582*a* may by an annular groove formed along an inner surface of the first collar member 1580*a*. The second collar member 1580*b* may similarly include a second receiving portion 1582*b*. The first and second collar members 1580*a*, 1580*b* may be fitted over the stator 1550 and the cap 1530 such that the first and second receiving portions 1582*a*, 1582*b* receive a portion of the engagement plate 1524 and the engagement ring 1536. The first and second collar members 1580*a*, 1580*b* may be secured to one another to form the first and second collar members 1580*a*, 1580*b* as a continuous circumferential collar about the stator 1550 and the cap 1530. For example, the first collar member 1580*a* may include a first collar retaining feature 1584*a* that defines a first lip 1586*a* and the second collar member 1580*b* may include a second collar retaining feature 1584*b* that define a second lip 1586*b*. The first and second lips 1586*a*, 1586*b* may complimentary engagement structures that are configured for attachment to one another, as shown in FIG. 16.

In other examples, it will be appreciated that the first and second collar members 1580*a*, 1580*b* may be portions of a collar member or other structure that facilitates the coupling of the stator 1550 and the cap 1530. For example, the nozzle assembly 1500 may include a collar member that may be of unitary construction. In this regard, the first and second collar members 1580*a*, 1580*b* may be portions of a unitary or one-piece structure. The unitary-formed collar member may be formed of an elastic material that is stretchable or otherwise elastically deformable such that the collar member deforms upon the application of a force, and relaxes and returns to an undeformed shape when the force ceases. In the example of FIG. 15, the elastic material may include a receiving portion that receives the engagement plate 1524 of the stator 1550 and the engagement ring 1536 of the cap 1530. In this regard, the collar member may be deformed to fit over the engagement plate 1524 and the engagement ring 1536, and thus exert a force on the engagement plate 1524 and the engagement ring 1536 to form a seal therebetween.

Other collar members and configurations are possible and contemplated herein, including collar members that incorporate both elastic and rigid elements to form a sealed passage between the stator 1550 and the cap 1530.

The nozzle assembly 1500 includes additional features that facilitate the attachment of stator 1550 to a source of the motive fluid, such as a source of foam. For example and as shown in FIG. 15, the nozzle assembly 1500 includes radial lugs 1514 and an attachment feature 1518 at the fluid connection 1510. The attachment feature 1518 may define a rotational lock that mitigates the nozzle assembly 1500 from inadvertently being rotated to an unlocked position. The attachment feature 1518 may optionally include clips, latches, and/or other securement structures. The radial lugs 1514 may include resilient features that are receivable by one or more features of a fluid input device or source to secure the nozzle assembly 1500. For example, the radial lugs 1514 may be resilient and partially deformable without cracking or failing. This may also allow the nozzle assembly 1500 to be removably attachable to a fluid source, as may be desirable when changing or replacing the nozzle assembly 1500 for servicing.

FIG. 16 depicts an interior of the example nozzle assembly 1500 in an assembled configuration. In FIG. 16, the cap 1530 is shown as including a shelf 1538 that defines a spray member passage 1560. For example, the shelf 1538 may include a set of first longitudinal walls 1562 and a set of second longitudinal walls 1564. The first and second sets of longitudinal walls 1562, 1564 may define the spray member passage 1560 as a substantially rectangular passage through the cap 1530. The spray member 1540 may be seated in the spray member passage 1560. The first set of longitudinal walls 1562 may be larger than a maximum width of the spray member 1540, such as being 50% or 100% larger. The second set of longitudinal walls 1564 may have a size that substantially corresponding to the maximum width of the spray member 1540. Accordingly, the first and second set of longitudinal walls a 1562, 164 may operate to constrain movement spray member 1540. For example, in response to rotation of the rotor 1570, the spray member 1540 may be constrained from rotating within the cap 1530. For example, the generally corresponding size of the second set of longitudinal walls 1564 and the maximum width of the spray member 1540 may permit the side-to-side movement of the spray member 1540 along a single path. This may cause the spray member 1504 to emit a spray in which ends of spray are generally in a straight line, such as that shown in FIG. 1A.

Figure 17:
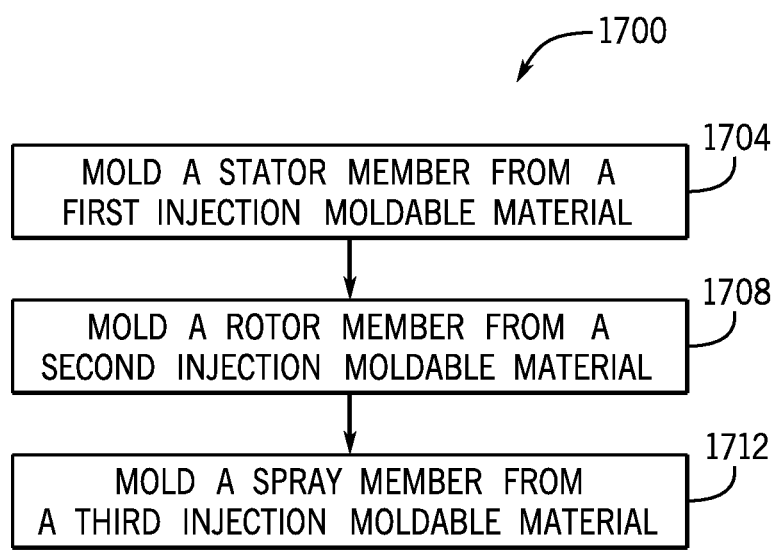
FIG. 17 depicts a flow diagram for a method manufacturing a nozzle assembly according to implementations of the present disclosure.

To facilitate the reader's understanding of the various functionalities of the embodiments discussed herein, reference is now made to the flow diagram in FIG. 17, which illustrates process 1700. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 17, process 1700 relates generally to a method for manufacturing a nozzle assembly according to implementations of the present disclosure. Accordingly, process 1700 may be used with any of the nozzle assemblies and spray systems described herein, for example, such as the nozzle assemblies 120, 200, 1400, 1500 and/or the spray system 104, and variations and combinations thereof.

At operation 1704, a stator member is molded from a first injection moldable material. The stator member has a stator surface that defines at least two stator cavities of a progressing cavity extending through the stator member. For example and with reference to FIG. 7, the stator member 250 may be molded from a first injection moldable material. The first injection moldable material may be used to form the stator member 250 as having a first stator cavity 258a and a second stator cavity 258b of the progressing cavity 254 that extends through the stator member 250.

At operation 1708, a rotor member is molded from a second injection moldable material. The rotor member has a rotor surface that defines at least one lobe configured for rotatable engagement with the at least two stator cavities of the progressing cavity. For example and with reference to FIG. 8, the rotor member 270 may be molded from a second injection moldable material. The second injection moldable material may be used to define the rotor member 270 as having the rotor surface 274 and lobe 276.

At operation 1712, a spray member is molded from a third injection moldable material. The spray member is configured for operable coupling with the rotor member and having a through portion for receiving a flow of fluid and emitting the flow of fluid form the nozzle assembly as a spray. For example and with reference to FIG. 11, the nozzle outlet 240 may be molded from a third injection moldable material. The third injection moldable material may be used to define the through portion 248 of the nozzle outlet 240 that is adapted to receive and direct flow for emitting a spray.

In light of the foregoing, each of the stator member 250, the rotor member 270, and the nozzle outlet 240 may be formed from an injection molding process. This may involve heating an injection moldable material, such as certain resins, and extruding the heated injection moldable material into a mold. In the mold, the material may be cooled in order to form the respective component of the nozzle assembly 200. Machining may also be used to further form the component, such as using an extractive processes in order to further define certain contours, surfaces, and edges of the component, including using machining to define one or more tapered surfaces of the nozzle assembly 200. It will be appreciated that other components of the nozzle assembly 200 may be formed using the method 1700, including forming the housing 204, the cap 230, or other component of the nozzle assembly 200 from a molding process and defining one or more tapered surfaces of the nozzle assembly 200 therethrough.

Where the progressing cavity 254 of the stator member 250 and the rotor member 270 taper, the two may be configured such that, during assembly, the rotor member 270 can be inserted into the stator member 250 in only one direction, namely the rotor member 270 can be inserted only at an end of stator member 250 having a widest opening relative to another opening of the stator member 250 at an opposite side. Particularly, the narrowest portion of the rotor member 270 may be inserted in to this widest portion of the stator member 250 and advanced towards the narrowest portion of the stator member 250. On completion of assembly of the rotor member 270 into the stator member 250, the respective narrower portions of these components may be aligned with each other, while the respective wider portions of these components may be aligned with each other. This tapered arrangement may also facilitate assembly of the stator member 250 into the housing of the nozzle assembly 200 where the housing 204 also defines a taper, described herein. In this case, the stator member 250 may be inserted into the housing 204 in only one direction, namely with the narrowest portion being inserted into a widest end of the housing 204 proximate the housing outlet 208 and advanced to the narrowest end of the housing 204 proximate the housing inlet 206 to form a complementary fit between the interior volume 210 of the housing 204 and the external surface of the stator member 250.

It will be appreciated that many varieties of injection moldable plastics may be used to form one or more or all of the components of the nozzle assembly 200. Sample injection moldable plastics includes polyethylene, acrylonitrile butadiene styrene, polycarbonate, polyamide, high impact polystyrene, polypropylene, and so on. The method 1700 includes a first injection moldable material, a second injection moldable material, and a third injection moldable material. In some cases the first, second, and third injection moldable material may be the same material. In other cases, one or more or all of the components of the nozzle assembly 200 may be constructed from a different injection moldable material. This may be desirable in order to selectively target or strengthen components of the nozzle assembly 200 as may be needed for a particular application.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A nozzle assembly comprising:
a stator member comprising a stator surface that defines a progressing cavity having at least two stator cavities serially arranged and coupled along a longitudinal axis of the stator member, wherein the stator member is configured such that motive fluid enters the progressing cavity at a proximal end of the stator member and exits the progressing cavity at a distal end of the stator member, and wherein a cross-sectional area of the progressing cavity increases along a longitudinal axis of the nozzle assembly from the proximal end to the distal end of the stator member, wherein a first stator cavity of the at least two stator cavities has a first cross-sectional area, a second stator cavity of the at least two stator cavities has a second cross sectional area greater than the first cross-sectional area, and the motive fluid is directed along the stator surface;

a rotor member in the progressing cavity, the rotor member comprising:
an elongated member having a rotor surface and extending between the proximal end and the distal end of the stator member and along the stator surface;
a first rotor lobe engaged with the stator surface in the first stator cavity; and
a second rotor lobe engaged with the stator surface in the second stator cavity, wherein:
a cross-sectional area of the rotor member increases from the proximal end to the distal end of the stator member,
the rotor surface and the stator surface define a first set of complementary tapered surfaces based on the engagement of the first rotor lobe and the first stator cavity,
the rotor surface and the stator surface define a second set of complementary tapered surfaces based on the engagement of the second rotor lobe and the second stator cavity, and
the at least two stator cavities are adapted for defining an oscillatory movement of the rotor member in response to a flow of the motive fluid through the progressing cavity;
a spray member associated with the rotor member and configured for movement with the oscillatory movement of the rotor member, the spray member having a spray inlet, a nozzle outlet, and a through portion extending between the spray inlet and the nozzle outlet; and
a cap seating the spray member adjacent the stator member and defining a port that remains fluidly coupled with the nozzle outlet during the movement of the spray member,
wherein the stator member, the rotor member, the spray member, and the cap cooperate to deliver an oscillatory spray of the motive fluid from the nozzle assembly.

2. The nozzle assembly of claim 1, wherein:
the nozzle assembly further comprises a housing defining a housing inlet at a proximal end, a housing outlet at a distal end, and interior volume extending between the housing inlet and the housing outlet; and
the stator member is seated within the interior volume of the housing.

3. The nozzle assembly of claim 2, wherein:
the housing includes an interior housing wall that defines the interior volume, and
the interior housing wall defines a tapered surface of the nozzle assembly that widens from the proximal end towards the distal end of the housing.

4. The nozzle assembly of claim 2, wherein:
the rotor member defines a first joint member arrangeable at or adjacent the housing outlet when the rotor member is assembled within the housing, and
the spray member defines a second joint member that is connected to the first joint member and allowing for multi-degree articulation of the spray member with the oscillatory movement of the rotor member.

5. The nozzle assembly of claim 1, wherein:
the spray member includes an interior spray member wall that defines the through portion extending between the spray inlet at a proximal end of the spray member and the nozzle outlet at a distal end of the spray member,
the interior spray member wall defines a tapered surface of the nozzle assembly, and
the tapered surface widens towards the distal end of the spray member.

6. The nozzle assembly of claim 4, wherein:
the first joint member comprises a ball joint,
the second joint member comprises a receiving socket, and
the ball joint is received within the receiving socket for the multi-degree articulation of the spray member with the oscillatory movement of the rotor member while the spray inlet remains substantially unimpeded by the rotor member.

7. The nozzle assembly of claim 1, wherein the progressing cavity has a first width at the first stator cavity, the progressing cavity has a second width at the second stator cavity, and the second width is greater than the first width.

8. The nozzle assembly of claim 1, wherein the first stator cavity is located toward the proximal end of the stator member relative to the second stator cavity along the longitudinal axis of the stator member.

9. A nozzle assembly comprising:
a stator member having a stator surface that defines at least two stator cavities of a progressing cavity extending through the stator member, wherein the at least two stator cavities are serially arranged and coupled along a longitudinal axis of the stator member, wherein the stator member is configured such that motive fluid enters the progressing cavity at a proximal end of the stator member and exits the progressing cavity at a distal end of the stator member, and wherein a cross-sectional area of the progressing cavity increases along a longitudinal axis of the nozzle assembly from the proximal end to the distal end of the stator member wherein:
a first stator cavity of the at least two stator cavities has a first cross-sectional area,
a second stator cavity of the at least two stator cavities has a second cross sectional area greater than the first cross-sectional area, and
the motive fluid is directed along the stator surface;
a rotor member arranged in the progressing cavity and having a rotor surface that defines:
a first lobe adapted for engagement with the first stator cavity,
a second lobe adapted for engagement with the second stator cavity, wherein:
a cross-sectional area of the rotor member increases from the proximal end to the distal end of the stator member,
the rotor surface and the stator surface define a first set of complementary tapered surfaces based on the engagement of the first rotor lobe and the first stator cavity,
the rotor surface and the stator surface define a second set of complementary tapered surfaces based on the engagement of the second rotor lobe and the second stator cavity, and
the rotor member is configured to rotate within the progressing cavity, and
the engagement of the at least one lobe with the at least two stator cavities is adapted to cause an oscillatory movement of the rotor member within the stator member during a rotation of the rotor member; and
a spray member configured to receive a flow of fluid from the progressing cavity and emit the flow of fluid from the nozzle assembly as a spray, wherein the spray member is connected to the rotor member and moveable by the rotor member during the rotation of the rotor member, the spray emitted from the spray member having an oscillation pattern of the rotor member.

10. The nozzle assembly of claim 9, wherein:

the nozzle assembly further comprises a housing defining a housing inlet at a proximal end, a housing outlet at a distal end, and an interior volume extending between the housing inlet and the housing outlet, and the stator member is seated within the interior volume of the housing and extending between the housing inlet and the housing outlet.

11. The nozzle assembly of claim 10, wherein:

the housing includes an interior housing wall that defines the interior volume, the stator member includes a first flange and a second flange, the first and second flanges being arranged at opposing ends of the stator member and configured for engagement with the interior housing wall, and the interior housing wall tapers between the housing inlet and the housing outlet such that a cross-sectional area of the interior housing wall increases from the proximal end to the distal end of the housing.

12. The nozzle assembly of claim 9, wherein:

the spray member has a spray inlet, a nozzle outlet, and a through portion extending between the spray inlet and the nozzle outlet, and the through portion tapers between the spray inlet and the nozzle outlet.

13. A method of manufacturing a nozzle assembly, the method comprising:

molding a stator member from a first injection moldable material, the stator member having a stator surface that defines at least two stator cavities of a progressing cavity extending through the stator member, wherein:

the at least two stator cavities are serially arranged and coupled along a longitudinal axis of the stator member, the stator member is configured to receive motive fluid in the progressing cavity at a proximal end of the stator member and transmit the motive fluid from the progressing cavity at a distal end of the stator member, and a cross-sectional area of the progressing cavity increases along a longitudinal axis of the stator member from the proximal end to the distal end of the stator member, a first stator cavity of the at least two stator cavities has a first cross-sectional area, and a second stator cavity of the at least two stator cavities has a second cross sectional area greater than the first cross-sectional area;

molding a rotor member from a second injection moldable material, the rotor member having a rotor surface that defines:

a first lobe configured for rotatable engagement with a first stator cavity of the at least two stator cavities;

a second lobe configured for rotatable engagement with a second stator cavity of the at least two stator cavities; wherein:

a cross-sectional area of the rotor member increases from the proximal end to the distal end of the stator member, the rotor surface and the stator surface define a first set of complementary tapered surfaces based on the engagement of the first rotor lobe and the first stator cavity, the rotor surface and the stator surface define a second set of complementary tapered surfaces based on the engagement of the second rotor lobe and the second stator cavity, and molding a spray member from a third injection moldable material, the spray member configured for operable coupling with the rotor member and having a through portion for receiving a flow of fluid and emitting the flow of fluid from the nozzle assembly as a spray.

14. The nozzle assembly of claim 13, wherein the first injection moldable material, the second injection moldable material, and the third injection moldable material are a common type of injection moldable material.

15. The nozzle assembly of claim 13, wherein the through portion of the spray member defines a tapered surface of the nozzle assembly.

16. The nozzle assembly of claim 13, further comprising:

inserting a proximal end of the rotor member in a distal end of the progressing cavity, and operatively connecting the spray member with a distal end of the rotor member, wherein a proximal end of the nozzle assembly corresponds to a proximal end of the progressing cavity and a distal end of the nozzle assembly corresponds to the distal end of the progressing cavity.

* * * * *